(12) United States Patent
Aytekin et al.

(10) Patent No.: US 11,556,796 B2
(45) Date of Patent: Jan. 17, 2023

(54) COMPRESSING WEIGHT UPDATES FOR DECODER-SIDE NEURAL NETWORKS

(71) Applicant: Nokia Technologies Oy, Espoo (FI)

(72) Inventors: Caglar Aytekin, Tampere (FI); Francesco Cricri, Tampere (FI); Yat Hong Lam, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 354 days.

(21) Appl. No.: 16/828,106

(22) Filed: Mar. 24, 2020

(65) Prior Publication Data

US 2020/0311551 A1 Oct. 1, 2020

Related U.S. Application Data

(60) Provisional application No. 62/823,227, filed on Mar. 25, 2019.

(51) Int. Cl.
*G06N 3/08* (2006.01)
*G06N 20/10* (2019.01)
*G06T 3/40* (2006.01)
*G06T 9/00* (2006.01)

(52) U.S. Cl.
CPC ............. *G06N 3/082* (2013.01); *G06N 20/10* (2019.01); *G06T 3/4046* (2013.01); *G06T 9/002* (2013.01)

(58) Field of Classification Search
None
See application file for complete search history.

(56) References Cited

U.S. PATENT DOCUMENTS

| | | | | |
|---|---|---|---|---|
| 2009/0287624 A1* | 11/2009 | Rouat | ................. | G06V 10/451 706/26 |
| 2018/0107926 A1* | 4/2018 | Choi | .................... | G06N 3/0472 |
| 2019/0362235 A1* | 11/2019 | Xu | .......................... | G06N 3/084 |
| 2020/0160151 A1* | 5/2020 | Urtasun | .................. | G06N 3/04 |
| 2020/0293876 A1* | 9/2020 | Phan | ..................... | H03M 7/702 |
| 2021/0089884 A1* | 3/2021 | Macready | .............. | G06N 10/00 |

OTHER PUBLICATIONS

Patrik O. Hoyer, "Non-negative Matrix Factorization with Sparseness Constraints", Journal of Machine Learning Research 5 (2004) 1457-1469 (Year: 2004).*

(Continued)

*Primary Examiner* — Xiaolan Xu
(74) *Attorney, Agent, or Firm* — Alston & Bird LLP

(57) ABSTRACT

A method, apparatus, and computer program product are provided for training a neural network or providing a pre-trained neural network with the weight-updates being compressible using at least a weight-update compression loss function and/or task loss function. The weight-update compression loss function can comprise a weight-update vector defined as a latest weight vector minus an initial weight vector before training. A pre-trained neural network can be compressed by pruning one or more small-valued weights. The training of the neural network can consider the compressibility of the neural network, for instance, using a compression loss function, such as a task loss and/or a weight-update compression loss. The compressed neural network can be applied within a decoding loop of an encoder side or in a post-processing stage, as well as at a decoder side.

20 Claims, 6 Drawing Sheets

(56) References Cited

OTHER PUBLICATIONS

Aytekin et al., *Compressibility Loss for Neural Network Weights*, arxiv.org, Cornell University Library (May 3, 2019) 7 pages.
Partial European Search Report for Application No. 20165121.3 dated Jul. 23, 2020, 11 pages.
Extended European Search Report for European Application No. 20165121.3 dated Oct. 26, 2020, 11 pages.
Finnish Application No. 20195116 filed Feb. 15, 2019; In re: Aytekin et al., entitled *Apparatus and a Method for Neural Network Compression.*

* cited by examiner

COMPRESSING WEIGHT UPDATES FOR DECODER-SIDE NEURAL NETWORKS

CROSS-REFERENCE TO RELATED APPLICATIONS

This application claims priority to and the benefit of U.S. Provisional Patent Application Publication No. 62/823,227, filed Mar. 25, 2019 and entitled "Compressing Weight Updates For Decoder-Side Neural Networks," the entire disclosure of which is hereby incorporated herein by reference for all purposes.

SUPPORT STATEMENT

The project leading to this application has received funding from the ECSEL Joint Undertaking (JU) under grant agreement No 783162. The JU receives support from the European Union's Horizon 2020 research and innovation programme and Netherlands, Czech Republic, Finland, Spain, Italy.

TECHNICAL FIELD

An example embodiment relates generally to neural networks, particularly to compressing weights for decoder-side neural networks.

BACKGROUND

Neural networks are being utilized in an ever-increasing number of applications for many different types of devices, such as mobile phones and various internet of things (IoT) devices. Neural networks may be used to, e.g., image and video analysis and processing, social media data analysis, and device usage data analysis.

Running neural network(s) require large memory and computational resources. Requirements for large memory and computational resources prohibit efficient use of neural networks and deployment of neural network(s) to devices having limited memory and computational resources, such as mobile phones and IoT devices. Further, transmission of neural networks among devices may be cumbersome, since transmission requires substantial bandwidth.

SUMMARY

A method, apparatus and computer program product are provided in accordance with an example embodiment for compressing weights for decoder-side neural networks. As a result of the compression, neural networks may be efficiently represented such that the requirements for memory and the computational complexity are reduced, thereby enabling efficient transmission of neural networks among devices.

In one example embodiment, a method is provided that includes training a neural network on a training dataset. In some embodiments, the training can comprise applying a task loss function and a weight-update compression loss function to the neural network during training. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the weight-update compression loss can be derived from the weight update. In some embodiments, the weight-update compression loss can be reduced, such as minimized, so the weight-updates are sparser (with many values close to zero) and the non-zero values can be closer to quantized values. In some embodiments, the weight-updates are sparsified by setting small weight-update values to zero based on a predetermined threshold. In some embodiments, the weight-update values may be quantized for example using a clustering algorithm. In some embodiments, reducing the weight-update compression loss may lower an entropy of a weight-update vector of the trained neural network. In some embodiments, the method can further include entropy encoding the weight-update to obtain a compressed weight-update.

In another example embodiment, a method is provided that includes providing a pre-trained neural network. In some embodiments, the neural network may be pretrained by maximizing generalization on a held-out validation dataset, by using at least a task loss function. In some other embodiments, the neural network may be pretrained by maximizing generalization on a held-out validation dataset, by using at least a task loss function and a weight compression loss. In some other embodiments, the neural network can be pretrained by using as a loss the average task loss of a set of temporarily overfitted models. In some embodiments, the temporarily overfitted models have each been overfitted to a small portion of data (such as a single image). In some embodiments, the neural network can be pretrained by applying a task loss function in the temporary overfitting stage. In some other embodiments, the neural network can be pretrained by applying a task loss function and a weight-update compression loss function in the temporary overfitting stage. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the method can further include compressing the weight-updates by pruning small-valued weight-updates. In some embodiments, weight-update compression loss can be reduced, such as minimized, so the weight-updates are more quantizable. In some embodiments, the weight-updates can be made sparser (with more values close to zero) and the non-zero values can be closer to quantized values. In some embodiments, reducing the weight-update compression loss may lower an entropy of a weight-update vector of the trained neural network.

In another example embodiment, an apparatus is provided that includes at least one processor and at least one memory that includes computer program code with the at least one memory and the computer program code configured to, with the at least one processor, cause the apparatus to at least train a neural network on a training dataset, wherein the training comprises applying a task loss function and a weight-update compression loss function. The weight-update compression loss function can comprise a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the at least one memory and the computer program code can be configured to, with the at least one processor, cause the apparatus to at least entropy encode the neural network to obtain a compressed neural network. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes at least one processor and at least one memory that includes computer program code with the at least one memory and the computer program code configured to, with the at least one processor, cause the apparatus to at least provide a pre-trained neural network. The pre-trained neural network has been previously trained, using a training dataset, by applying a task loss function and a weight-update compression loss function. The weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the at least one memory and the computer program code can be configured to, with the at least one processor, cause the apparatus to at least compress the pre-trained neural network by pruning small-valued weights. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes means for training a neural network on a training dataset. In some embodiments, the apparatus can include means for training the neural network by, at least, applying a task loss function and a weight-update compression loss function to the neural network. In some embodiments, the weight-update compression loss function comprises a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the apparatus can further include means for entropy encoding the neural network to obtain a compressed neural network. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes means for providing a pre-trained neural network. In some embodiments, the pre-trained neural network can be previously trained, using a training dataset, by applying a task loss function and a weight-update compression loss function. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the apparatus can further include means for compressing the pre-trained neural network by pruning small-valued weights. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In a further example embodiment, a computer program product is provided that includes at least one non-transitory computer-readable storage medium having computer-executable program code instructions stored therein with the computer-executable program code instructions including program code instructions configured to at least cause one or more processors to train a neural network on a training dataset. The training comprises applying a task loss function and a weight-update compression loss function. The weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to at least cause the one or more processors to entropy encode the neural network to obtain a compressed neural network. In some embodiments, the weight-update compression loss can be reduced, such as minimized, so as weight-updates to be sparser (with many values close to zero) and the non-zero values can be closer to quantized values. In some embodiments, reducing the weight-update compression loss may lower an entropy of a weight-update vector of the trained neural network.

In a further example embodiment, a computer program product is provided that includes at least one non-transitory computer-readable storage medium having computer-executable program code instructions stored therein with the computer-executable program code instructions including program code instructions configured to at least cause one or more processors to provide a pre-trained neural network, the pre-trained neural network having been previously trained, using a training dataset, by applying a task loss function and a weight-update compression loss function, the weight-update compression loss function comprising a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to at least cause the one or more processors to compress the pre-trained neural network by pruning small-valued weights. In some embodiments, the weight-update compression loss can be reduced, such as minimized, so as to be sparser (with many values close to zero) and the non-zero values can be closer to quantized values. In some embodiments, reducing the weight-update compression loss may lower an entropy of a weight-update vector of the trained neural network.

In another embodiment, a method is provided that includes temporarily overfitting a neural network on a first image of a plurality of images for a first predetermined number of times to generate a first temporarily overfitted neural network. In some embodiments, the method can further include, after iteratively temporarily overfitting the neural network on the first image of the plurality of images, resetting one or more weights to an initial weight value. In some embodiments, the method can further include iteratively temporarily overfitting the first temporarily overfitted and reset neural network to a second image of the plurality of images for a second predetermined number of times to generate a second temporarily overfitted neural network. In some embodiments, the method can further include, after iteratively temporarily overfitting the neural network on the second image of the plurality of images, resetting one or more weights to an initial weight value. In some embodiments, the method can further include iteratively temporarily overfitting the neural network on any number of additional images of the plurality of images, resetting the neural network after some or all of the temporary overfitting steps. In some embodiments, the method can include temporarily overfitting the neural network on each of the plurality of images and resetting after each iterative temporary overfitting step. In some embodiments, iteratively temporarily overfitting the neural network comprises applying at least a task loss function and a weight-update compression loss function. In some embodiments, the method can further include computing an average loss over the overfitted neural networks, based on the performance of the first overfitted neural network relative to the first image and the performance of the second overfitted neural network relative to the second image. In some embodiments, the method can further include computing one or more gradient values based on the average loss value and one or more neural network weights. In some embodiments, the method can further include updating the neural network using the gradient values. In some embodiments, the method can further include repeating the above updating for a number of iterations. In some embodiments, the method can further include using a final updated neural network as a pretrained neural network. The pretrained neural network is usable as a starting point when overfitting the neural network to a small set of data to be encoded.

In another example embodiment, an apparatus is provided that includes at least one processor and at least one memory that includes computer program code with the at least one memory and the computer program code configured to, with the at least one processor, cause the apparatus to at least temporarily overfit a neural network on a first image of a plurality of images a first predetermined number of times to generate a first temporarily overfitted neural network. In some embodiments, overfitting can be carried out using a task loss function and/or a weight-update compression loss function. In some embodiments, the weight-update compression loss function can comprise a ratio of an L1-norm of a weight-update vector to an L2-norm of the weight-update vector. In some embodiments, the at least one memory and the computer program code can be configured to, with the at least one processor, cause the apparatus to at least, after the neural network is iteratively temporarily overfit on the first image of the plurality of images, reset one or more weights to an initial weight value. In some embodiments, the at least one memory and the computer program code can be configured to, with the at least one processor, cause the apparatus to at least iteratively temporarily overfit the first temporarily overfitted and reset neural network to a second image of the plurality of images a second predetermined number of times to generate a second temporarily overfitted neural network. In some embodiments, the at least one memory and the computer program code can be configured to, with the at least one processor, cause the apparatus to at least iteratively overfit the neural network on any number of additional images of the plurality of images and reset the neural network after overfitting the neural network on some or all of the respective images. In some embodiments, the at least one memory and the computer program code can be configured to, with the at least one processor, cause the apparatus to at least overfit the neural network on each of the plurality of images and resetting after each iterative overfitting step. In some embodiments, the at least one memory and the computer program code can be configured to, with the at least one processor, cause the apparatus to at least computing an average loss over the overfitted neural networks, based on the performance of the first temporarily overfitted neural network relative to the first image and the performance of the second temporarily overfitted neural network relative to the second image. In some embodiments, the at least one memory and the computer program code can be configured to, with the at least one processor, cause the apparatus to at least compute one or more gradient values based on the average loss value and one or more neural network weights. In some embodiments, the at least one memory and the computer program code can be configured to, with the at least one processor, cause the apparatus to at least update the neural network using the gradient values. In some embodiments, the at least one memory and the computer program code can be configured to, with the at least one processor, cause the apparatus to at least repeat the above updating for a number of iterations. In some embodiments, the apparatus can be configured to determine when the neural network has been temporarily prefitted on a predetermined number of images and to discontinue the above described steps thereafter. In some embodiments, after discontinuing the iterative temporary overfitting of the neural network on individual images or other data from the training database, a final updated neural network is formed. In some embodiments, the at least one memory and the computer program code can be configured to, with the at least one processor, cause the apparatus to at least use the final updated neural network as a pretrained neural network. The pretrained neural network is usable as a starting point when overfitting the neural network to a small set of data to be encoded. In some embodiments, iteratively overfitting the neural network comprises applying at least a task loss function and/or a weight-update compression loss function.

In another example embodiment, an apparatus is provided that includes means, such as the processor, for training a neural network on a training dataset. In some embodiments, the apparatus can include means, such as the processor, for temporarily overfitting a neural network on a first image of a plurality of images for a first predetermined number of times to generate a first temporarily overfitted neural network. In some embodiments, the apparatus can include means, such as the processor, such that, after iteratively, temporarily overfitting the neural network on the first image of the plurality of images, resetting one or more weights to an initial weight value. In some embodiments, the apparatus can include means, such as the processor, for iteratively temporarily-overfitting the first temporarily overfitted and resetting the neural network to a second image of the plurality of images for a second predetermined number of times to generate a second temporarily overfitted neural network. In some embodiments, the apparatus can include means, such as the processor, for computing an average loss over all the temporarily overfitted neural networks, based on the performance of the first temporarily overfitted neural network relative to the first image and the performance of the second temporarily overfitted neural network relative to the second image. In some embodiments, the apparatus can include means, such as the processor, for computing one or more gradient values based on the average loss value and one or more neural network weights. In some embodiments, the apparatus can include means, such as the processor, for updating the neural network using the gradient values. In some embodiments, apparatus can include means, such as the processor, for causing the apparatus to at least repeat each of the above steps in the proper order for a predetermined number of iterations. In some embodiments, the apparatus can include means, such as the processor, for determining when the neural network has been temporarily prefitted on the predetermined number of images and to discontinue the above described steps thereafter. In some embodiments, after discontinuing the iterative temporary overfitting of the neural network on individual images or other data from the training database, a final updated neural network is formed. In some embodiments, the apparatus can include means, such as the processor, for using the final updated neural network as a pretrained neural network. In some embodiments, the pretrained neural network is usable as a starting point when overfitting the neural network to a small set of data to be encoded. In some embodiments, iteratively overfitting the neural network comprises applying at least a task loss function and/or a weight-update compression loss function.

In a further example embodiment, a computer program product is provided that includes at least one non-transitory computer-readable storage medium having computer-executable program code instructions stored therein with the computer-executable program code instructions including program code instructions configured to at least temporarily overfit a neural network on a first image of a plurality of images for a first predetermined number of times to generate a first temporarily overfitted neural network. In some embodiments, overfitting can be carried out by applying a task loss function and/or a weight-update compression loss function. In some embodiments, the weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to, after iteratively temporarily-overfitting the neural network on the first image of the plurality of images, at least reset one or more weights to an initial weight value. In some embodiments, the computer-executable program code instructions stored on the non-transitory computer-readable storage medium can be configured to at least iteratively temporarily-overfit the first temporarily overfitted and reset neural network to a second image of the plurality of images for a second predetermined number of times to generate a second temporarily overfitted neural network. In some embodiments, the computer-executable program code instructions stored on the non-transitory computer-readable storage medium can be configured to at least compute an average loss over all the temporarily overfitted neural networks, based on the performance of the first temporarily overfitted neural network relative to the first image and the performance of the second temporarily overfitted neural network relative to the second image. In some embodiments, the computer-executable program code instructions stored on the non-transitory computer-readable storage medium can be configured to at least compute one or more gradient values based on the average loss value and one or more neural network weights. In some embodiments, the computer-executable program code instructions stored on the non-transitory computer-readable storage medium can be configured to at least update the neural network using the gradient values. In some embodiments, the computer-executable program code instructions stored on the non-transitory computer-readable storage medium can be configured to at least repeat each of the above steps in the proper order for a predetermined number of iterations. In some embodiments, the computer-executable program code instructions stored on the non-transitory computer-readable storage medium can be configured to at least determine when the neural network has been temporarily prefitted on the predetermined number of images and to discontinue the above described steps thereafter. In some embodiments, after discontinuing the iterative temporary overfitting of the neural network on individual images or other data from the training database, a final updated neural network is formed. In some embodiments, the computer-executable program code instructions stored on the non-transitory computer-readable storage medium can be configured to at least use the final updated neural network as a pretrained neural network. In some embodiments, the pretrained neural network is usable as a starting point when overfitting the neural network to a small set of data to be encoded. In some embodiments, the iteratively temporarily-overfit neural network can be overfit by applying at least a task loss function and/or a weight-update compression loss function.

In some embodiments, a method for pretraining a neural network can include maximizing generalization performance, such as by reducing, such as minimizing, at least a task loss on a held-out validation dataset. In some embodiments, a method for pretraining a neural network can include maximizing generalization performance and compression of weights, such as by reducing at least a task loss and a weights compression loss on a held-out validation dataset. In some embodiments, the method for pretraining a neural network can include maximizing the overfitting performance, such as by reducing, such as minimizing, the average task loss, averaged over a set of temporarily overfitted models. In some embodiments, each temporarily overfitted model is a model temporarily overfitted on a relatively small (e.g., one) set of data (e.g., images). In some embodiments, the iterative temporary overfitting can start from an initial version of the pretrained model or a partially trained model or an untrained model. After each temporary overfitting step, the model can be reset to the state before the latest temporary overfitting step. In other words, the model can be reset to the pretrained version of the model. In some embodiments, temporary overfitting can be carried out using at least the task loss. In some embodiments, the temporary overfitting can be carried out using at least the task loss and the weight-update compression loss. In some embodiments, once the neural network is pretrained, the pretrained neural network can be overfitted on a small set of data (e.g., one image) that is to be compressed or encoded. In some embodiments, the overfitting can be carried out using at least the task loss (task loss function). In some embodiments, the overfitting can be carried out using at least the task loss (task loss function) and the weight-update compression loss (weight-update compression loss function).

In some embodiments, an apparatus can be provided that comprises: means for training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; and means for pruning weight-update values which are within a predetermined range from zero, and quantizing the weight-update values and the pruned weight-update values. In some embodiments, the apparatus can further comprise: means for entropy encoding the resulting weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, an apparatus can be provided that comprises: means for pretraining a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values, the apparatus further comprising: means for repeating the updating for a number of iterations. In some embodiments, the apparatus can further comprise: means for using a final updated neural network as a starting point when overfitting the neural network to a set of data to be encoded. In some embodiments, the apparatus can further comprise: means for entropy encoding the resulting weight-update vector to obtain a compressed weight-update vector.

In some embodiments, a method may be provided that comprises: training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; and pruning weight-update values which are within a predetermined range of zero, and quantizing the weight-update values and the pruned weight-update values. In some embodiments, the method can further comprise: entropy encoding the weight-update vector to obtain a compressed weight-update vector. In some embodiments, the weight-update compression loss function is minimized to increase a sparsity and a quantizability of non-zero weight-update values. In some embodiments, minimizing the weight-update values lowers an entropy of a weight-update vector of the trained neural network.

In some embodiments, a method can be provided that comprises: pretraining a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values; the method further comprising: repeating the updating for a number of iterations. In some embodiments, the method can further comprise using a final updated neural network as a starting point when overfitting the neural network to a set of data to be encoded. In some embodiments, the method can further comprise: entropy encoding the resulting weight-update vector to obtain a compressed weight-update vector.

In some embodiments, a computer-readable storage medium can be provided that has program code instructions stored therein that are configured, upon execution, to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; prune weight-update values which are within a predetermined range of zero; and quantize the weight-update values and the pruned weight-update values. In some embodiments, the program code instructions can be further configured, upon execution, to: entropy encode the weight-update vector to obtain a compressed weight-update vector.

In some embodiments, a computer-readable storage medium can be provided that has program code instructions stored therein that are configured, upon execution, to: pretrain a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values. In some embodiments, the program code instructions are further configured, upon execution, to: repeat the updating for a number of iterations. In some embodiments, the program code instructions are further configured, upon execution, to: use a final updated neural network as a pretrained neural network, the pretrained neural network usable as a starting point when overfitting the neural network to a small set of data to be encoded.

In some embodiments, a method is provided that comprises: training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; pruning weight-update values which are between zero and a predetermined threshold value; and quantizing the weight-update values and the pruned weight-update values. In some embodiments, the method can further comprise: entropy encoding the resulting weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, a method is provided, that comprises: a) temporarily overfitting a neural network on a first image of a plurality of images for a first predetermined number of times to generate a first temporarily overfitted neural network; b) after temporarily-overfitting the neural network on the first image of the plurality of images for the first predetermined number of times, resetting one or more weights to an initial weight value to generate a first temporarily overfitted and reset neural network; c) temporarily overfitting the first temporarily overfitted and reset neural network to a second image of the plurality of images for a second predetermined number of times to generate a second temporarily overfitted neural network; d) computing an average loss over all the temporarily overfitted neural networks, based on a performance of the first temporarily overfitted neural network relative to the first image and the performance of the second temporarily overfitted neural network relative to the second image; e) computing one or more gradient values based on the average loss value and one or more neural network weights; and f) updating the neural network using the gradient values. In some embodiments, the method further comprises: repeating each of a-e a number of times to generate a pretrained neural network. In some embodiments, the method further comprises: overfitting the pretrained neural network to a small set of data to be encoded.

In some embodiments, an apparatus is provided that comprises at least one processor and at least one memory storing computer program code, the at least one memory and the computer program code configured to, with the processor, cause the apparatus to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; prune weight-update values which are between zero and a predetermined threshold value; and quantize the weight-update values and the pruned weight-update values. In some embodiments, the at least one memory and the computer program code are further configured to, with the processor, to cause the apparatus to: entropy encode the weight-update vector to obtain a compressed weight-update vector. In some embodiments, the weight-update compression loss function is minimized to increase a sparsity and a quantizability of non-zero weight-update values. In some embodiments, minimizing the weight-update values lowers an entropy of a weight-update vector of the trained neural network.

In some embodiments, an apparatus is provided that configures to pretrain and use a neural network, the apparatus comprising at least one processor and at least one memory storing computer program code, the at least one memory and the computer program code configured to, with the processor, cause the apparatus to: a) temporarily overfit the neural network on a first image of a plurality of images for a first predetermined number of times to generate a first temporarily overfitted neural network; b) after temporarily-overfitting the neural network on the first image of the plurality of images for the first predetermined number of times, reset one or more weights to an initial weight value to generate a first temporarily overfitted and reset neural network; c) temporarily overfit the first temporarily overfitted and reset neural network to a second image of the plurality of images for a second predetermined number of times to generate a second temporarily overfitted neural network; d) compute an average loss over all the temporarily overfitted neural networks, based on a performance of the first temporarily overfitted neural network relative to the first image and the performance of the second temporarily overfitted neural network relative to the second image; e) compute one or more gradient values based on the average loss value and one or more neural network weights; and f) update the neural network using the gradient values. In some embodiments, the at least one memory and the computer program code are further configured to, with the processor, cause the apparatus to: repeat each of a-e a number of times to generate a pretrained neural network. In some embodiments, the at least one memory and the computer program code are further configured to, with the processor, cause the apparatus to: overfit the pretrained neural network to a small set of data to be encoded.

In some embodiments, a computer program product is provided that comprises a non-transitory computer-readable storage medium having stored thereon computer-readable code, which, when executed by at least one processor, causes the at least one processor to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; prune weight-update values which are between zero and a predetermined threshold value; and quantize the weight-update values and the pruned weight-update values. In some embodiments, the computer-readable code, when executed by the at least one processor, further causes the at least one processor to: entropy encode the weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, a computer program product is provided, the computer program product being operable for pretraining and using a neural network, the computer program product comprising a non-transitory computer-readable storage medium having stored thereon computer-readable code, which, when executed by at least one processor, causes the at least one processor to: a) temporarily overfit the neural network on a first image of a plurality of images for a first predetermined number of times to generate a first temporarily overfitted neural network; b) after temporarily-overfitting the neural network on the first image of the plurality of images for the first predetermined number of times, reset one or more weights to an initial weight value to generate a first temporarily overfitted and reset neural network; c) temporarily overfit the first temporarily overfitted and reset neural network to a second image of the plurality of images for a second predetermined number of times to generate a second temporarily overfitted neural network; d) compute an average loss over all the temporarily overfitted neural networks, based on a performance of the first temporarily overfitted neural network relative to the first image and the performance of the second temporarily overfitted neural network relative to the second image; e) compute one or more gradient values based on the average loss value and one or more neural network weights; and f) update the neural network using the gradient values. In some embodiments, the computer-readable code, when executed by the at least one processor, further causes the at least one processor to: repeat each of a-f a number of times to generate a pretrained neural network; and overfit the pretrained neural network to a small set of data to be encoded.

BRIEF DESCRIPTION OF THE DRAWINGS

Figure 1:
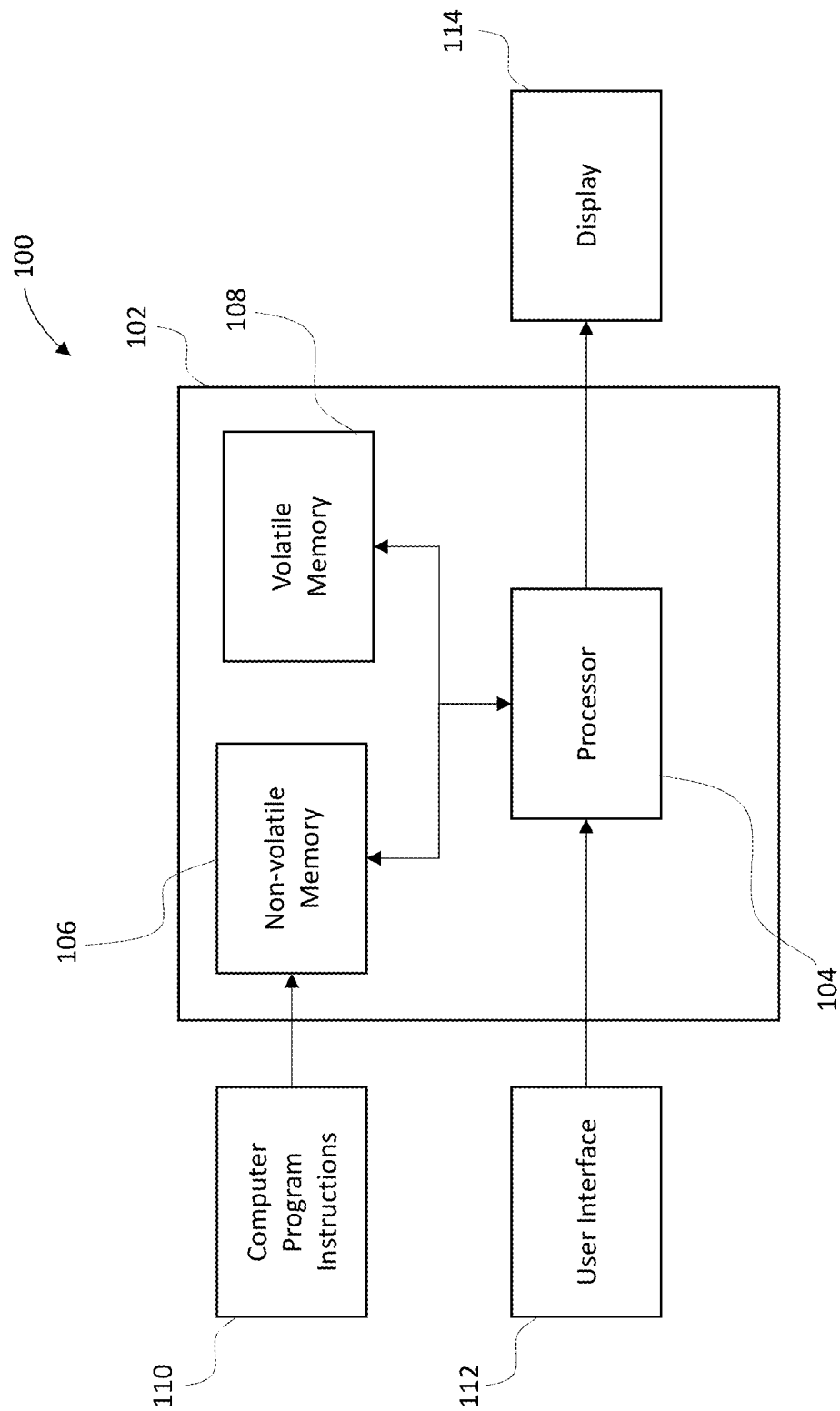
Figure 2:
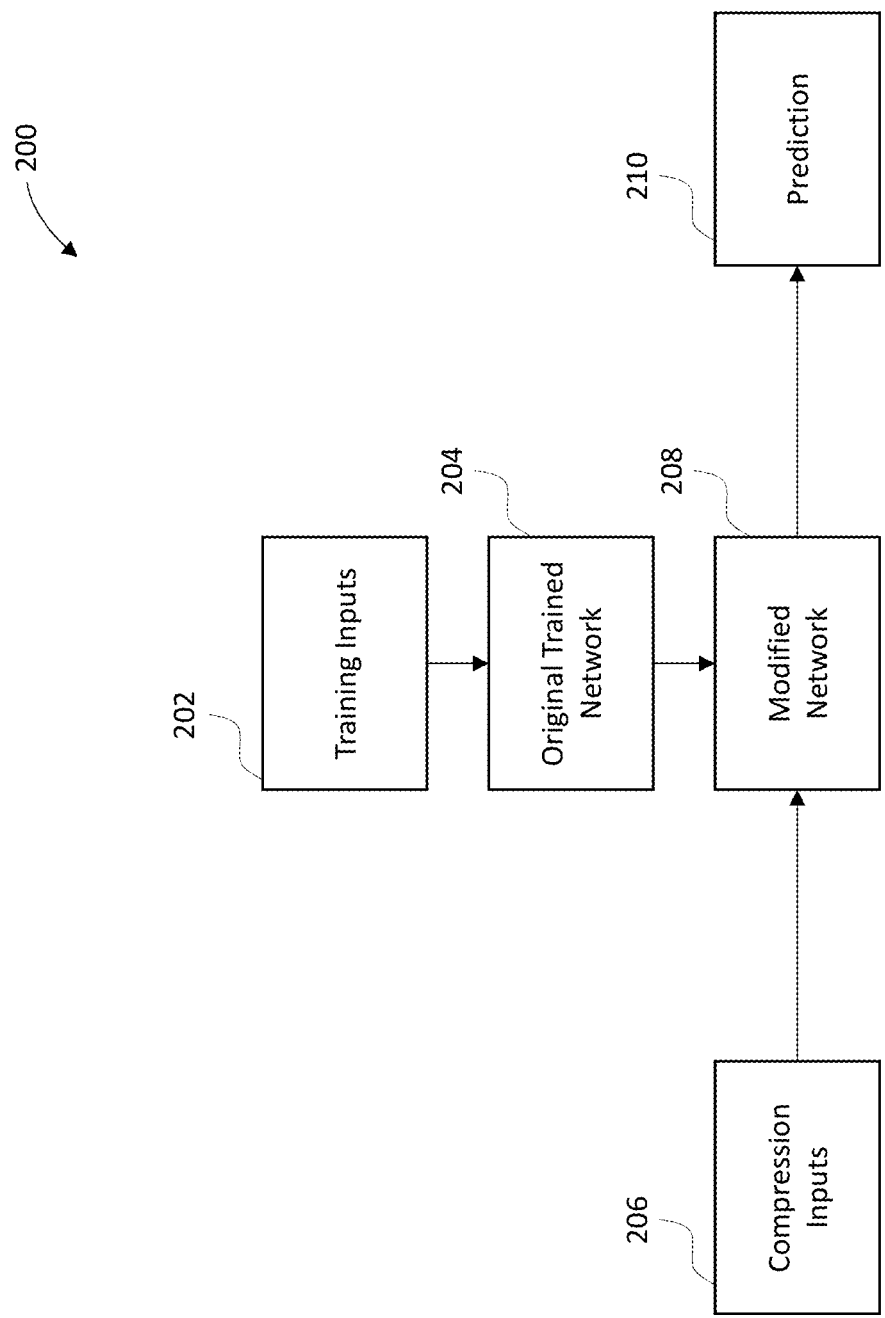
Figure 3:
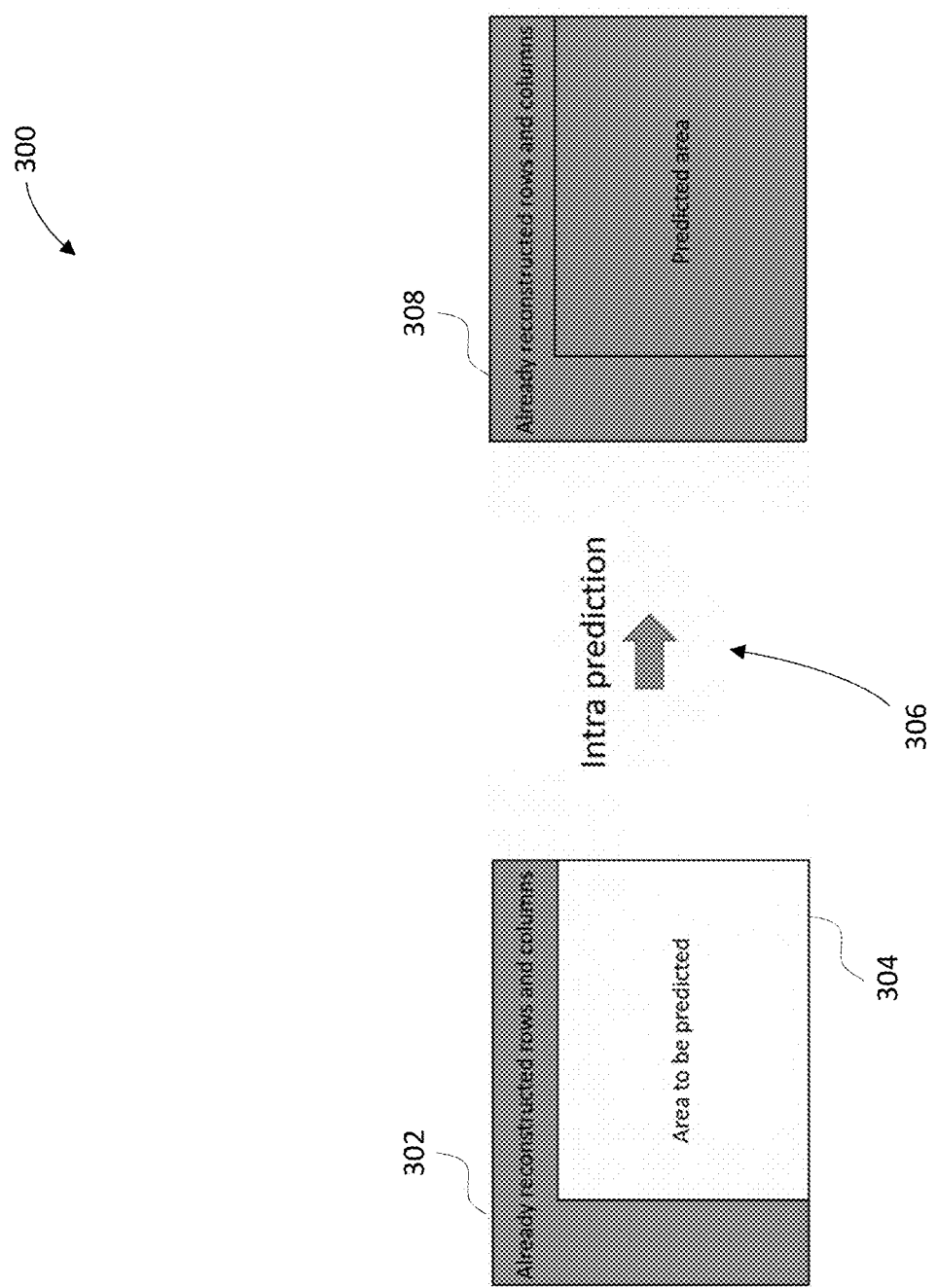
Figure 4:
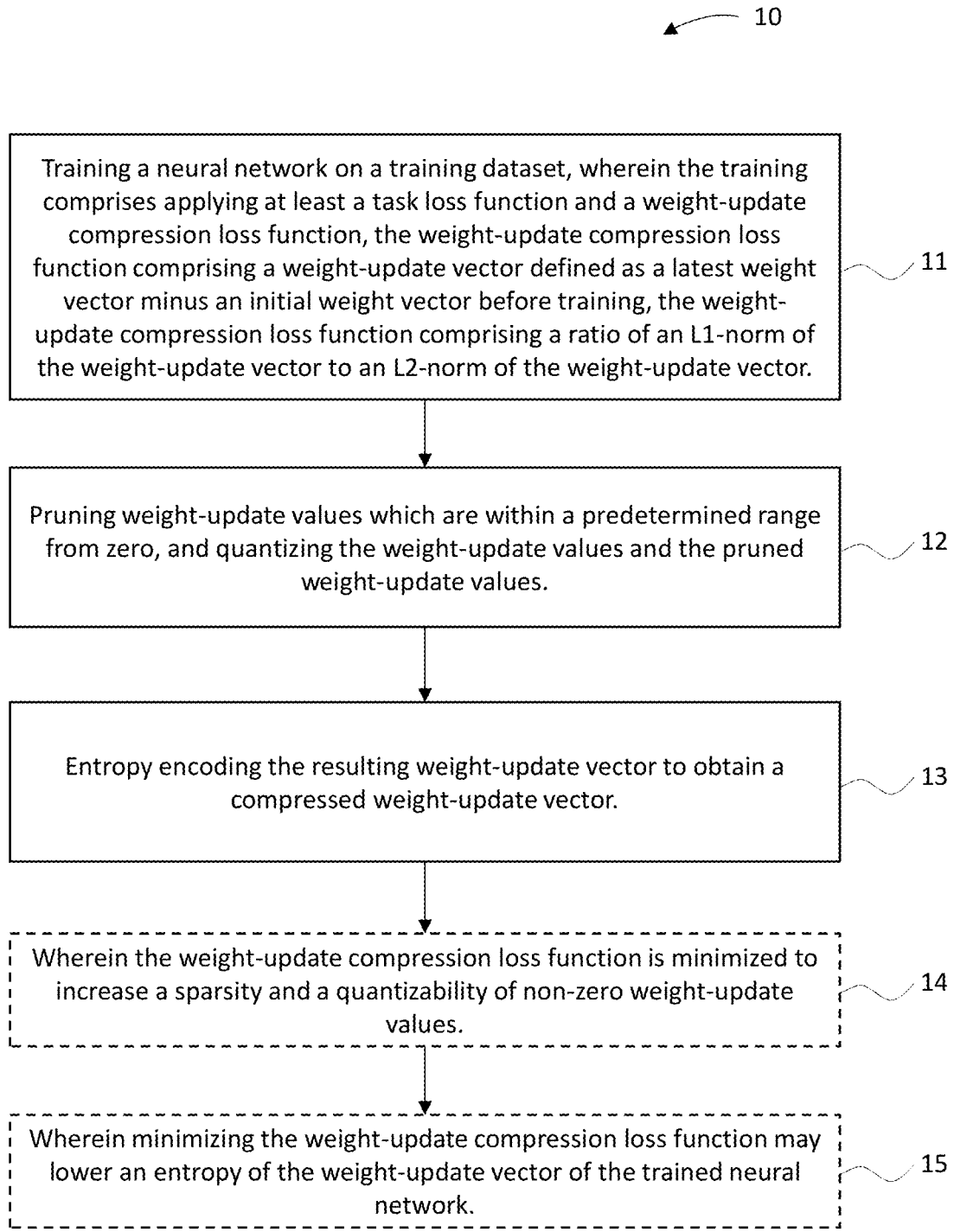
Figure 5:
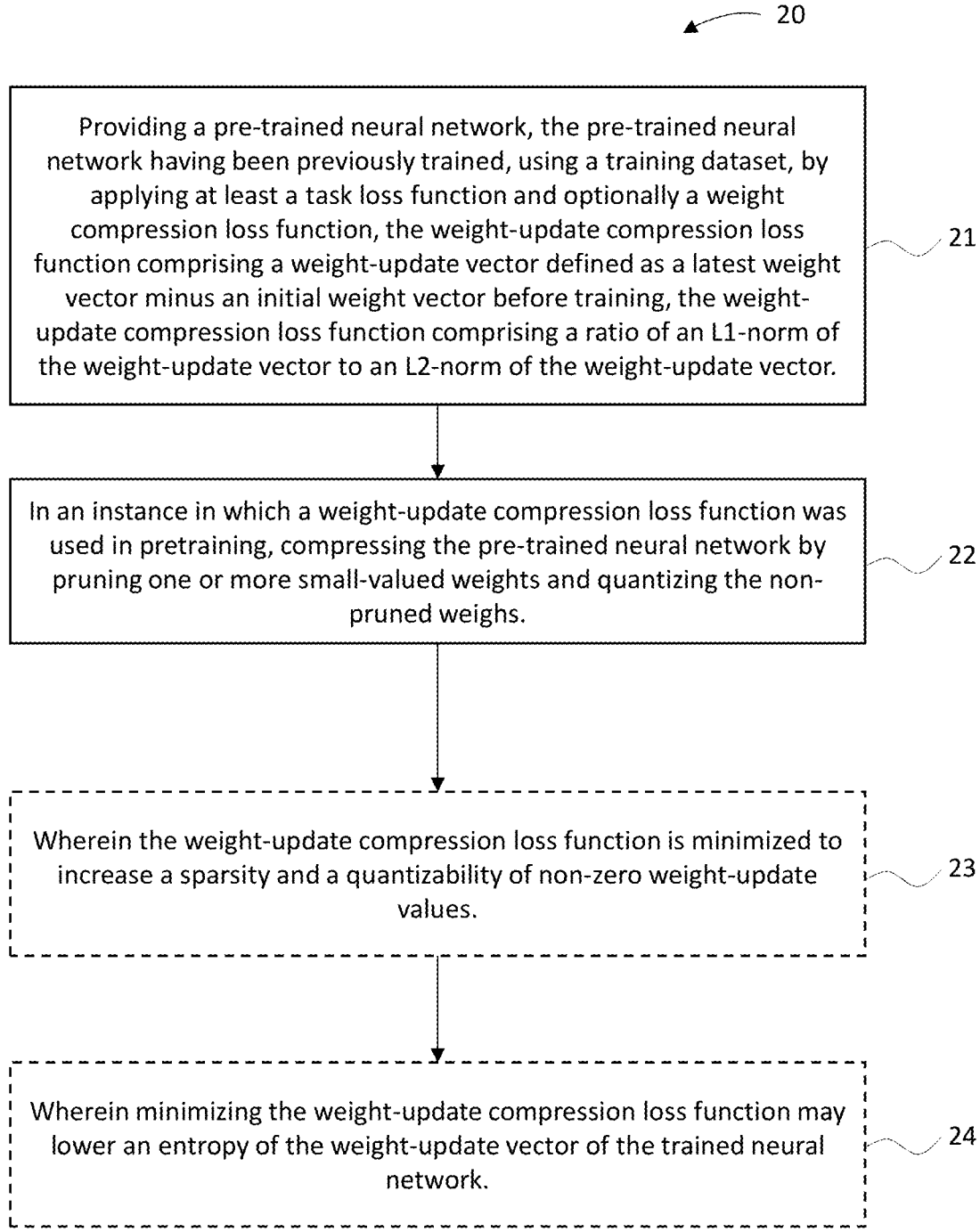
Figure 6:
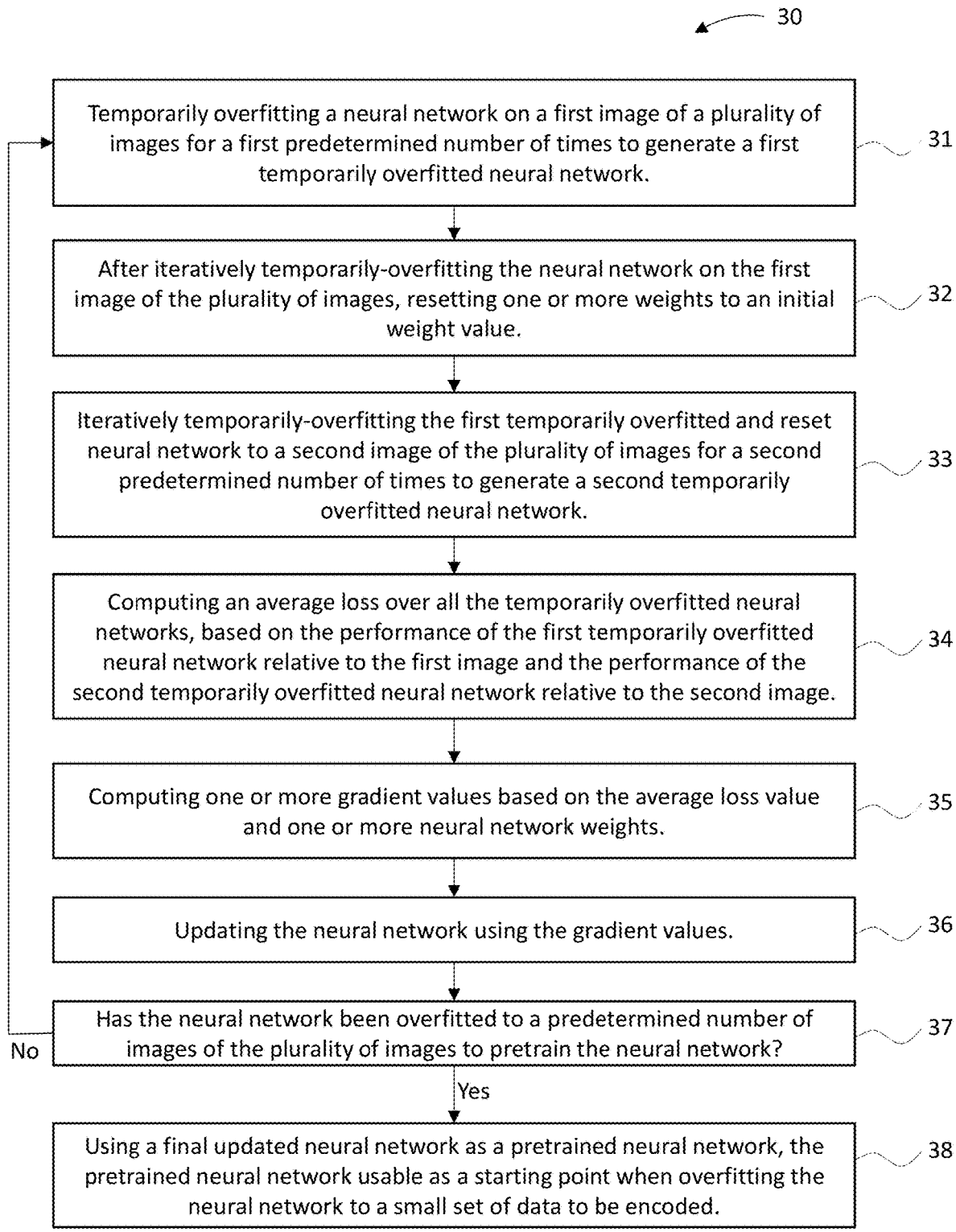

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating a set of operations performed, such as by the apparatus of FIG. 1, in accordance with an example embodiment of the present invention;

FIG. 3 is a graphical representation of input and output data for intra-predication of a particular block, in accordance with an example embodiment of the present invention;

FIG. 4 is a flowchart illustrating a set of operations performed, such as by the apparatus of FIG. 1, in accordance with an example embodiment of the present invention;

FIG. 5 is a flowchart illustrating a set of operations performed, such as by the apparatus of FIG. 1, in accordance with an example embodiment of the present invention; and FIG. 6 is a flowchart illustrating a set of operations performed, such as by the apparatus of FIG. 1, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the terms "model," "machine learning environment," "deep learning framework," "neural network," "neural net," and "network" are used interchangeably, and may refer to a framework or environment for algorithms and the like to be implemented to process complex data inputs. In some implementations of the embodiments described herein, a "neural network" and the like can comprise a computation graph comprising several layers of computation.

As used herein, the weights or weighting values used for neural networks are sometimes referred to as "learnable parameters," "learned parameters," or simply as "parameters," terms which are used interchangeably herein.

As used herein, "overfitting," "fine-tuning," "specializing," "optimizing," and "training" are used interchangeably to refer to processes by which a neural network is trained so that the network performs well for a specific content. In other words, a neural network can be overfitted for a particular image (a training set) such that the predictive accuracy of the neural network for the particular image is higher than for images new to the neural network (a test set). This result can be advantageous, as described herein, when a large dataset is used and memorization of that dataset is helpful for prediction, such as when a pixel is being recreated during decoding based upon a nearby already recreated pixel and "inter-" or "intra-" prediction can be carried out by an overfitted neural network. When referring to the pretraining of a neural network, at least "overfitting," "temporary overfitting," "temporarily overfitted," and the like are used interchangeably throughout this disclosure. When referring to the encoding of a particular image or set of images using a pretrained neural network, "overfitting" is typically used rather than "temporarily overfitting," however it will be understood that any similar term can be used to describe either process for pretraining the neural network and/or encoding an image or other such data without limitation.

As used herein, "task loss" refers to the main loss that a neural network needs to reduce, such as to minimize, in order to be trained to perform the task of interest. For example, if the task of interest is classification, the task loss may be the cross-entropy loss. If the task of interest is regression, the task loss may be the Mean Squared Error.

It is to be understood that in this disclosure, the terms "vector," "multi-dimensional vector," "matrix," and/or "tensor" are used interchangeably to refer to a representation of one or more calculations to be carried out by or as a part of the neural network or the like. In other words, in an instance in which the disclosure refers to a vector, a matrix or any other similar representation (such as characters of a computer language, code, short-hand, integers, matrices, tables, arrays, maps, plots, values, notations, combinations thereof, or the like) might additionally or alternatively be useful for representing the one or more calculations.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

A neural network is a computation graph comprising several layers of computation. Each layer comprises one or more units, where each unit performs an elementary computation. A unit is connected to one or more other units, and the connection may have associated a weight. The weight may be used for scaling the signal passing through the associated connection. Weights are usually learnable parameters, e.g., values which can be learned from training data. There may be other learnable parameters, such as those of batch-normalization layers.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units included in certain layers take input from units in one or more of preceding layers and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural networks, there is a feedback loop, so that the network becomes stateful, e.g., it is able to memorize information or a state.

Neural networks are being utilized in an ever-increasing number of applications for many different types of device, such as mobile phones. Examples include image and video analysis and processing, social media data analysis, device usage data analysis, etc.

An important property of neural networks (and other machine learning tools) is that they are able to learn properties from input data, either in a supervised way or in an unsupervised way. Such learning is a result of a training algorithm, or of a meta-level neural network providing the training signal.

A neural network can be generated, trained, tested, implemented, and otherwise controlled or affected through the use of any suitable computing device or other such apparatus or device, such as any of those described herein, and the like. As an example, a neural network can be generated by a processor and stored on a memory, such as a server or the like. Referring now to FIG. 1, an example of an apparatus and system for carrying out the methods, processes, and approaches described herein is provided.

FIG. 1 illustrates a block diagram of an apparatus 100 for compressing weight updates for a neural network, according to an example embodiment. It will be appreciated that the apparatus 100 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for compressing weight updates for a neural network, other configurations may also be used to implement certain embodiments of the present disclosure.

The apparatus 100 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 100 is embodied as a mobile computing device, such as mobile telephones, mobile computers, personal digital assistants (PDAs), pagers, laptop computers, desktop computers, gaming devices, televisions, e-papers, and other types of electronic systems, which may employ various embodiments of the invention.

The apparatus 100 can include a computing device 102 including a processor 104, and storage, such as a non-volatile memory 106 and/or volatile memory 108. In some embodiments, the processor 104 may, for example, be embodied as various means including circuitry, one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 104 comprises a plurality of processors. These signals sent and received by the processor 104 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the apparatus 100 or a component thereof may be capable of operating according to Wi-Fi or Worldwide Interoperability for Microwave Access (WiMAX) protocols.

It is understood that the processor 104 may comprise circuitry for implementing audio/video and logic functions of the apparatus 100. For example, the processor 104 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC), an internal data modem (DM), and/or the like. Further, the processor may comprise functionality to operate one or more software programs, which may be stored in memory. For example, the processor 104 may be capable of operating a connectivity program, such as a web browser. The connectivity program may allow the apparatus 100 to transmit and receive web content, such as location-based content, according to a protocol, such as Wireless Application Protocol (WAP), hypertext transfer protocol (HTTP), and/or the like. The apparatus 100 may be capable of using a Transmission Control Protocol/Internet Protocol (TCP/IP) to transmit and receive web content across the internet or other networks.

The apparatus 100 may also comprise a user interface 112 including, for example, an earphone or speaker, a ringer, a microphone, a user display, a user input interface, and/or the like, which may be operationally coupled to the processor 104. In this regard, the processor 104 may comprise user interface circuitry configured to control at least some functions of one or more elements of the user interface, such as, for example, the speaker, the ringer, the microphone, the display, and/or the like. The processor 104 and/or user interface circuitry comprising the processor 104 may be configured to control one or more functions of one or more elements of the user interface through computer program instructions (e.g., software and/or firmware) stored on a memory accessible to the processor 104 (e.g., non-volatile memory 106, volatile memory 108, and/or the like). Although not shown, the apparatus 100 may comprise a battery for powering various circuits related to the apparatus 100, for example, a circuit to provide mechanical vibration as a detectable output. The apparatus 100 can further comprise a display 114. In some embodiments, the display 114 may be of any type appropriate for the electronic device in question with some examples including a plasma display panel (PDP), a liquid crystal display (LCD), a light-emitting diode (LED), an organic light-emitting diode display (OLED), a projector, a holographic display, or the like. The user interface 112 may comprise devices allowing the apparatus 100 to receive data, such as a keypad, a touch display (e.g., some example embodiments wherein the display 114 is configured as a touch display), a joystick (not shown), and/or other input device. In embodiments including a keypad, the keypad may comprise numeric (0-9) and related keys (#, *), and/or other keys for operating the apparatus 100.

The apparatus 100 may comprise memory, such as the non-volatile memory 106 and/or the volatile memory 108, such as RAM, read only memory (ROM), non-volatile RAM (NVRAM), a subscriber identity module (SIM), a removable user identity module (R-UIM), and/or the like. In addition to the memory, the apparatus 100 may comprise other removable and/or fixed memory. In some embodiments, the volatile memory 108 may include Random Access Memory (RAM) including dynamic and/or static RAM, on-chip or off-chip cache memory, and/or the like. In some embodiments, the non-volatile memory 106, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like the volatile memory 108, the non-volatile memory 106 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 100.

Returning to FIG. 1, in an example embodiment, the apparatus 100 includes various means for performing the various functions herein described. These means may comprise one or more of the processor 104, the non-volatile memory 106, the volatile memory 108, the user interface 112, or the display 114. The means of the apparatus 100 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., storage 106 or 108) that is executable by a suitably configured processing device (e.g., the processor 104), or some combination thereof.

In some example embodiments, one or more of the means illustrated in FIG. 1 may be embodied as a chip or chip set. In other words, the apparatus 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 104, the memory 106 and/or 108, the user interface 112, and/or the display 114 may be embodied as a chip or chip set. The apparatus 100 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein.

The processor 104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 104 comprises a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In embodiments wherein the apparatus 100 is embodied as an apparatus 100, the processor 104 may be embodied as or comprise the processor 104 (shown in FIG. 1). In some example embodiments, the processor 104 is configured to execute instructions stored in the memory 106 and/or 108 or otherwise accessible to the processor 104. These instructions, when executed by the processor 104, may cause the apparatus 100 to perform one or more of the functionalities of the apparatus 100 as described herein. As such, whether configured by hardware or software methods, or by a combination thereof, the processor 104 may comprise an entity capable of performing operations according to embodiments of the present invention while configured accordingly. Thus, for example, when the processor 104 is embodied as an ASIC, FPGA or the like, the processor 104 may comprise specifically configured hardware for conducting one or more operations described herein. Alternatively, as another example, when the processor 104 is embodied as an executor of instructions, such as may be stored in the memory 106 and/or 108, the instructions may specifically configure the processor 104 to perform one or more algorithms and operations described herein.

The memory 106 and/or 108 may comprise, for example, volatile memory, non-volatile memory, or some combination thereof. In this regard, the memory 106 and/or 108 may comprise a non-transitory computer-readable storage medium. Although illustrated in FIG. 1 as a single memory, the memory 106 and/or 108 may comprise a plurality of memories. The plurality of memories may be embodied on a single computing device or may be distributed across a plurality of computing devices collectively configured to function as the apparatus 100. In various example embodiments, the memory 106 and/or 108 may comprise a hard disk, random access memory, cache memory, flash memory, a compact disc read only memory (CD-ROM), digital versatile disc read only memory (DVD-ROM), an optical disc, circuitry configured to store information, or some combination thereof. In some embodiments, the memory 106 and/or 108 may comprise the volatile memory 108 and/or the non-volatile memory 106 (shown in FIG. 1). The memory 106 and/or 108 may be configured to store information, data, applications, instructions, or the like for enabling the apparatus 100 to carry out various functions in accordance with various example embodiments. For example, in some example embodiments, the memory 106 and/or 108 is configured to buffer input data for processing by the processor 104. Additionally or alternatively, the memory 106 and/or 108 may be configured to store program instructions for execution by the processor 104. The memory 106 and/or 108 may store information in the form of static and/or dynamic information. The stored information may include, for example, images, content, media content, user data, application data, and/or the like. This stored information may be stored and/or used by the processor 104 during the course of performing its functionalities.

In some embodiments, the apparatus 100 can further comprise a communication interface (not shown) that may be embodied as any device or means embodied in circuitry, hardware, a computer program product comprising computer readable program instructions stored on a computer readable medium (e.g., the memory 106 and/or 108) and executed by a processing device (e.g., the processor 104), or a combination thereof that is configured to receive and/or transmit data from/to another computing device. In some example embodiments, the communication interface is at least partially embodied as or otherwise controlled by the processor 104. In this regard, the communication interface may be in communication with the processor 104, such as via a bus. The communication interface may include, for example, an antenna, a transmitter, a receiver, a transceiver and/or supporting hardware or software for enabling communications with one or more remote computing devices. In embodiments wherein the apparatus 100 is embodied as an apparatus 100, the communication interface may be embodied as or comprise the transmitter and the receiver. The communication interface may be configured to receive and/or transmit data using any protocol that may be used for communications between computing devices. In this regard, the communication interface may be configured to receive and/or transmit data using any protocol that may be used for transmission of data over a wireless network, wireline network, some combination thereof, or the like by which the apparatus 100 and one or more computing devices may be in communication. As an example, the communication interface may be configured to receive and/or otherwise access content (e.g., web page content, streaming media content, and/or the like) over a network from a server or other content source. The communication interface may additionally be in communication with the memory 106 and/or 108, user interface 112 and/or the processor 104, such as via a bus.

The user interface 112 may be in communication with the processor 104 and configured to receive an indication of a user input and/or to provide an audible, visual, mechanical, or other output to a user. As such, the user interface 112 may include, for example, a keyboard, a mouse, a joystick, a display, a touch screen display, a microphone, a speaker, and/or other input/output mechanisms. In embodiments wherein the apparatus 100 is embodied as an apparatus 100, the user interface 112 may be embodied as or comprise the user input interface, such as the display 114 (shown in FIG. 1), and other components such as a keypad, mouse, etc. The user interface 112 may be in communication with the memory 106 and/or 108, communication interface, a sensor, a speaker, and/or the processor 104, such as via a bus. In some example embodiments, the user interface 112 may comprise a single input/output mechanism. In other embodiments, the user interface 112 may comprise a content display and touch display, such as the display 114. In some embodiments, the user interface 112 may comprise a touch display user interface with a content display portion and a dedicated user input portion, such as a virtual keyboard, virtual piano, or an application with a designated key for user input.

The processor 104 may be embodied as various means, such as circuitry, hardware, a computer program product comprising computer readable program instructions stored on a computer readable medium (e.g., the memory 106 and/or 108) and executed by a processing device (e.g., the processor 104), or some combination thereof and, in some embodiments, is embodied as or otherwise controlled by the processor 104. The processor 104 may further be in communication with one or more of the memory 106 and/or 108, or user interface 112, such as via a bus.

The processor 104 may be configured to receive a user input from a user interface 112, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the processor 104 may determine an element/instruction/command that corresponds with a key, or image, displayed on the touch display user interface at the determined position or within a predefined proximity (e.g., within a predefined tolerance range) of the determined position. The processor 104 may be further configured to perform a function or action related to the key corresponding to the element/instruction/command determined by the processor 104 based on the position of the touch or other user input.

The touch display may not only detect physical contact but may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

As described, any apparatus or device, such as the apparatus 100 described herein in any configuration and comprising any combination of suitable componentry, can be used to carry out any of the methods, processes, and approaches described herein. For instance, the apparatus 100 (e.g., the processor 104 in conjunction with one or more of the memories 106, 108) can carry out the computer program instructions 110 in order to generate, train, test, and/or implement any of the algorithms, processes, methods, neural networks, machine learning algorithms, or the like, as described herein.

In general, a training algorithm may be caused, e.g., using the apparatus 100, to change some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, e.g., to gradually decrease the loss.

Oftentimes, training a neural network is an optimization process, but the final goal is different from the typical goal of optimization. In optimization, the only goal is to reduce, such as to minimize, a function. In machine learning, the goal of the optimization or training process is to make the model learn the properties of the data distribution from a limited training dataset. In other words, the goal is to learn to use a limited training dataset in order to learn to generalize to previously unseen data, e.g., data which was not used for training the model. This is usually referred to as generalization. In practice, data is usually split into at least two sets, the training set and the validation set. The training set is used for training the network, e.g., to modify its learnable parameters in order to reduce, such as to minimize, the loss. The validation set is used for checking the performance of the network on data which was not used to reduce, such as to minimize, the loss, as an indication of the final performance of the model. In particular, the errors on the training set and on the validation set are monitored during the training process to understand the following:

If the network is learning at all—in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set error, or the validation set error does not decrease, or the validation set error even increases, the model is in the regime of overfitting. This result means that the model has just memorized the training sets properties and performs well only on that set but performs poorly on a set not used for tuning its parameters.

Neural networks are usually trained on a large training dataset to learn the general characteristics of the data and then are applied on new data unseen during training. This is called generalization capacity. However, one can exploit the memorization or overfitting capacity of neural networks, which is usually not wanted, to optimize the network on a specific content. In the case of compression, neural networks may be used at decoder side. According to some embodiments, overfitting these networks can be done at the encoder side, which may be the only side for which the original, higher-quality data are available.

The problem is that the decoder side does not have the overfitted network, which needs to be sent by the encoder to the decoder, for example by including it into the encoded bitstream. However, neural network may require a huge number of bits—they typically contain millions of weights, and each weight may be a floating-point 32 bits number.

Thus, the problem of efficiently sending the overfitted network arises. Therefore, disclosed generally herein are approaches and methods for sending a compressed form of only the weight update, and related algorithms for implementing these ideas in the context of decoder-side neural networks for image and video coding.

A common strategy adopted for neural network compression is a 2-stage process. First the neural network is trained normally without considering the compression aspect. Next, the weights of the neural networks are processed such that the resulting neural networks can be more efficiently represented (e.g., can be coded in lower bit rates). This processing may include quantization of weights (uniform or non-uniform) or pruning the weights (e.g., disabling weights with low absolute value by setting them to zero). These strategies have been observed to keep the accuracy of the neural network to some extent (sometimes even obtaining higher accuracy than the original model due to extra regularization that they introduce) while reducing the required memory to represent the neural network to a high degree.

Another methodology is the following: given a defined model architecture, train the neural network such that the trained representation is sparse. These methods include approximating quantization during training, learning pruning, and enforcing sparsity during training.

Referring now to FIG. 2, an approach 200 can include providing training inputs 202 to train a network, generating an original trained network 204. Further, the approach 200 can include using compression inputs 206 (e.g., loss vectors and the like) to further or simultaneously modify the network to generate a modified network 208, e.g., such that weights are highly compressible. The modified network 208 can then be used to make a prediction 210 for a particular dataset (e.g., one or more images, one or more audio files, one or more videos, etc.). By way of example only, any of the processes of the approach 200 can be carried out using the apparatus 100 or any combination of components thereof.

The general approach 200 to compressing neural networks can include training a neural network by applying a loss function configured to increase sparsity of a weight tensor of the neural network and to cause a plurality of non-zero elements of the weight tensor to be substantially equal to each other, and to entropy encode the weight tensor to obtain a compressed neural network. As described herein, a process of updating a neural network in an efficient way gives special attention and implementation details to decoder-side neural networks for the use case of data compression. While embodiments are often described herein for encoding/decoding image and video data, the approaches and embodiments described herein can also be used for encoding/decoding and processing audio data, social media data, device usage data, and the like.

In some embodiments, a method is provided for using neural networks in image and video compression, so what follows is a brief introduction about video compression.

The so-called hybrid video compression is based on performing intra- and inter-prediction and then transform-coding the residual or prediction-error. Usually, a video frame is divided into blocks and each block is encoded separately (but not necessarily independently). In many video codecs a block can be coded either in intra-mode or in inter-mode. In intra-mode, the block is predicted from spatially-nearby blocks of the same frame, which were already reconstructed. In inter-mode, the block is predicted from temporally-nearby blocks (other frames). Then, only the prediction error (residual) needs to be encoded, which is the error between the (intra- or inter-) predicted block and the real block. The prediction-error, or residual, is usually transform-coded to reduce redundancy and achieve higher compression gains. Typical transforms comprise Discrete Cosine Transforms. The transform-domain block is a set of coefficients representing the content of the block (the residual) at different frequencies. Next, a quantization is applied on the transform coefficients. Quantization may be uniform for all transform coefficients, or adaptive quantization matrices may be used, e.g., where low frequency coefficients are quantized with higher precision or granularity, and higher frequency coefficients are quantized with lower precision or granularity. Finally, the quantized transform coefficients are entropy-coded, for example using an arithmetic encoder.

Importantly, the intra- and inter-prediction are processes which are done at the decoder, therefore they need to be done also within the encoder and more specifically in the "decoding loop" of the encoder, in order to compute the residual. The residual is computed as: residual=original−prediction. Then, the residual is quantized and encoded. The decoded residual will have some quantization error and is denoted as q_residual. The reconstructed data is as follows:

reconstruction=prediction+q_residual. Since there may be a loss of information due to the quantization of the residual, the reconstruction may be different from the original data and results in lower quality. The quantization is usually controlled by a predetermined Quantization Parameter (QP). The higher the QP, the coarser quantization is performed and thus the lower quality the reconstruction is.

This disclosure relates generally to several processes which are performed when decoding and which can be performed by a neural network. For example, these decoding processes may be intra-prediction, inter-prediction, in-loop filter, post-processing filter. These processes are usually performed by algorithmic approaches (e.g., not using learned approaches like neural networks). By way of example only, and in no way intending to limit the scope of this disclosure, the intra-prediction and the post-processing filters are discussed in further detail herein.

During decoding, coding units (e.g., blocks) are typically coded in raster-scan order within a coding tree unit, and coding tree units are typically coded in raster-scan order within a tile. Therefore, for each block to be predicted, the already reconstructed pixels are those above and on the left of the block. Usually, out of all the already reconstructed pixels above and on the left of the block to be predicted, only a few rows and columns are used for the intra-prediction, such as 2 or 4.

Thus, intra-prediction includes using those few rows and columns of pixels above and on the left for deriving how the block may look like. Blocks are usually relatively small, such as 8 by 8 pixels, thus the intra prediction process may reduce to predict a small image pattern such as an edge or textural detail or even a constant/homogeneous area. See FIG. 3 for an overview of the intra-prediction input and output for a certain block.

In particular, the approach (e.g., 200) can be or comprise an approach 300 whereby an area of, for example, an image, can include a first area 302 of already reconstructed pixels, rows of pixels, and/or columns of pixels, and a second area 304 of pixels, rows of pixels, and/or columns of pixels that are to be predicted based on the first area 302. An intra-prediction process 306 can be carried out using the pixels in the first area 302 to predict the pixels in the second area 304, to form a fully reconstructed area 308 of pixels, rows of pixels, and/or columns of pixels.

There are usually different "prediction-modes" which are pre-defined. Each prediction mode refers to a different image pattern, such as homogeneous content (the predicted area has same constant value as the left and top already reconstructed pixels, a.k.a. DC prediction mode), deriving a smoothly changing prediction block (e.g., planar mode of H.264/AVC or HEVC), or a directional mode. The directionality of a prediction mode for intra prediction, e.g., the prediction direction to be applied in a particular prediction mode, may be e.g., vertical, horizontal, or a selected diagonal mode, corresponding to different directional prediction angles. Directional prediction modes may be considered to correspond to edges with different angles/orientations. During encoding, all or several prediction modes are tried, and the best one is selected based on the mean squared error (MSE) (or other cost function) between the predicted block and the real block. The prediction mode is then signaled to the decoder, by including it into the block's residual bitstream.

Intra prediction is an active research field. In simple terms, having a better intra prediction means that the prediction error or residual is smaller, thus requiring less bits to encode the intra frames which are a big part of the entire video's bitstream.

Once an image or frame has been completely decoded, it is possible to apply a filter on top of this decoded frame in order to increase its reconstruction quality (e.g., as measure by the Peak-Signal-to-Noise-Ratio (PSNR)).

Neural networks may be used to replace or to complement some of the processes done during video encoding and/or decoding. For example, a neural network may be used to perform intra-prediction, or to enhance the result of the conventional intra-prediction. Also, a neural network can be used to perform the post-processing filter. Also, a neural network can be used to perform most of the decoding process, such as in the case of end-to-end learned compression systems using the neural auto-encoder architecture. This disclosure, therefore, relates also to any decoder-side neural network used in the decoding process.

In some embodiments, an apparatus (e.g., the apparatus 100) can be used to first pre-train a neural network, on a training dataset. This pretrained neural network can be present at both the encoder side (e.g., in the decoding loop, or in post-processing stage) and the decoder side. The pre-training may or may not take into account the compressibility of the neural network, e.g., in one possible implementation the pretrained network itself may be pre-trained by using at least a task loss and a weight-compression loss, in another implementation the pretrained network may be pretrained and then compressed for example by pruning small-valued weights, in yet another implementation there may be no compression happening to the pretrained network.

In some embodiments, when an image (or other data type) needs to be encoded, the encoder side overfits the pretrained neural network on that specific image, by using a combination of task loss (e.g., MSE) and of a proposed weight-update compression (WUC) loss. The proposed WUC loss aims at making many weight-update values (e.g., many elements of the weight-update vector) close to zero and making the non-zero weight-update values to be more quantizable (e.g., closer to quantized values). As a result, the effect of reducing, such as minimizing, the WUC loss is to lower the entropy of weight-update and thus require fewer bits to be coded. To this end, the WUC loss comprises computing the L1 norm of the L2-normalized weight-update vector (or, in other words, the ratio of the L1 norm of weight update vector over the L2 norm of the weight update vector). The weight-update vector is defined as the latest weight vector minus the initial weight vector before overfitting started (e.g., the weight vector of the pretrained neural network).

In an additional embodiment, if the neural network is applied within the decoding loop (instead of during post-processing, or as a neural network which performs most or all the decoding process), one may need to consider the evolution of the neural network during the overfitting and thus re-generate the training data, by using the latest overfitted neural network for generating the reconstructed data used as input to the neural network prediction process.

Pre-Training

Many embodiments described herein relate generally to data compression using neural networks. As such, the disclosure will mainly focus on embodiments and approaches for image and video compression, but various embodiments of the disclosed approach can be used with any other data type or combination thereof.

In data compression systems, there is usually an encoder-side, which performs the compression process, and a decoder-side, which performs the decompression process.

In some embodiments, it can be assumed and/or determined that one or more neural networks can be/are used at least at the decoder side, for example within the decoding loop or during post-processing or as a neural network performing most or all the decoding process.

One example of in-loop neural network is a neural network performing intra-prediction. Another example is a neural network performing filtering of the output of intra or inter prediction. One example of post-processing is to enhance an image or frames which has been reconstructed by a decoding process. Another example is a neural network performing most or the whole decoding process such as in neural auto-encoders.

In some embodiments, it can be assumed and/or determined that, during an offline phase (e.g., not when the data needs to be compressed), an initial version of the neural network is obtained, by pre-training it on a dataset. Pre-training may be done in such a way that subsequent overfitting phases may be as quick and effective as possible. One possible pre-training strategy may consist of pre-training by maximizing generalization capabilities, as measured by a metric computed on a held-out validation set (e.g., a data set not used for training), where the metric can be at least a task loss, or a combination of at least a task loss and a weight compression loss. Another possible pre-training strategy may consist of pre-training by maximizing the performance of the neural network when it is overfitted on a small set of data such as one image. For this pretraining strategy, at each pretraining iteration, the neural network is temporarily overfitted on different images in sequence (first temporarily overfit on one image using a predetermined number of temporary overfitting iterations, then reset weights to initial point of this temporary overfitting stage and temporarily overfit on another image using a predetermined number of temporary overfitting iterations, and so on), then compute the performance of each temporarily overfitted model when evaluated on the image on which it was temporarily overfitted, then average these performances to obtain the loss value for the current pretraining iteration, compute the gradients of this loss with respect to the network's weights and finally update the network using these gradients. At each pretraining iteration, the number of images used for performing the temporary overfitting iterations may be predetermined, for example it can be 10 or 100. At each pretraining iteration, the number of temporary overfitting iterations used to temporarily overfit each image may be predetermined, for example it can be 10, 100, or 1000. During the temporary overfitting iterations, in some embodiments, at least the task loss is used. In other embodiments, at least the task loss and the weight-update compression loss are used.

The pretrained network is assumed to be present at both the encoder side and the decoder side. For example, a third-party entity has delivered the pretrained neural network to encoder and decoder. Or the encoder has received the pretrained neural network from another entity and encoder sends the pretrained neural network to the decoder. Or the encoder has performed the pre-training and then sends the neural network to the decoder. Any combination of such methods or similar methods are considered within the scope of this disclosure.

The pretrained network is assumed to be pretrained such that the decoding process which uses this pretrained network would work sufficiently well (as measured by the usual metrics utilized in compression literature, such as PSNR, bitrate, Bjøntegaard delta bitrate, etc.), even without overfitting, although this is not a strict requirement.

For in-loop filters, pre-training may be performed by first generating training data by running the encoder. Each sample of training data can comprise the input to the neural network and the desired output (the ground-truth data, also referred here to as original data).

In the case of intra-prediction, the input may be the previously reconstructed data, such as the K rows above and K columns on the left of the block to be predicted. In an alternative implementation of intra-prediction using neural networks, the input may be the previously reconstructed data and the prediction performed by the conventional algorithm (e.g., the algorithm commonly used in codecs, which is usually a non-learned algorithm). This last option is similar to an in-loop filter. In the case of a post-processing filter, the input is the images that have been decoded. In the case of intra-prediction, the desired output is the original block that needs to be predicted.

In the case of a post-processing filter, the desired output is the original image.

In the case of a neural network which performs most or the whole decoding process, as in the case of the decoder of a neural auto-encoder, the desired output is the original image.

It may be beneficial, during training of a neural network which is used in-loop, to re-generate the training data (in particular the input data). In fact, without re-generation, the neural network is trained to receive as input the data reconstructed by using the conventional algorithm (because the neural network is not yet trained). This is different from the test phase (when the neural network is actually utilized), where the reconstructed data which is input to the neural network is obtained by using the neural network itself, e.g., the reconstructed data at the beginning of the pre-training is: reconstruction=conventional_prediction+q_residual_conv, where q_residual_conv=Q(original−conventional_prediction), and Q is the quantization process. Instead, at test time (after training the neural network [NN]) the reconstructed data is: reconstruction=NN_prediction+q_residual_NN, where q_residual_NN=Q(original−NN_prediction).

Thus, every few training iterations or epochs, data needs to be generated such that the input contains the following reconstructed data: reconstruction(t)=NN(t)_prediction+q_residual_NN(t), where t denotes the iteration or epoch index. For example, the system may decide to regenerate the data when the neural network provides a sufficiently big improvement based on a performance metric (PSNR, bitrate, BD-rate, etc), for example with respect to a predetermined threshold.

Overfitting

In order to make the pretrained neural network perform better on the current image to be encoded, an approach for overfitting the pretrained neural network on this current image is disclosed that uses an algorithm which tries to reduce, such as to minimize, the entropy and thus the bitrate of the weight-update. This way, the bitrate overhead needed to send the weight-update to the decoder will be reduced, such as minimized, while still allowing for improving the decoder-side neural network for the current image. As described below, it is to be understood that the overfitting is performed by using the pretrained network as a starting point.

The overfitting may be performed on the whole neural network or on a subset of weights of the neural network. One possible way to select the subset of weights on which overfitting is applied, is to first run a temporary overfitting on the whole neural network by using at least a task loss, such as a reconstruction loss. Then, one may observe which weights or convolutional filters or layers get updated the most and select those for the actual overfitting (that would start again from the pretrained neural network).

The overfitting is a training stage which happens by using data belonging to the current image to be encoded, and it is done over one or more training iterations and epochs. As a general comment, the data used for this overfitting may also be a subset of the data. For example, for images, the data used for overfitting may be part of the image, whereas for videos, the data used for overfitting may be some of the frames or some parts of some frames. If a subset of data is used, it may be necessary to perform the overfitting process for different subsets of data, and for each subset send the corresponding weight-update.

In the case of an in-loop neural network, one epoch is defined as the time during which data from the whole image has been used for training. One iteration is defined as the time during which a weight-update has been computed using a subset of all the data belonging to the whole image (e.g., a subset of the blocks).

In the case of a post-processing neural network, one iteration may consist of updating the neural network using the whole image as input, and one epoch may consist of a predetermined number of iterations.

The overfitting is performed by inputting data to the neural network, getting its output, computing a loss on this output, differentiating the loss with respect to the neural network's weights, and updating the weights according to the computed gradients.

In some embodiments, a loss can be used which is a combination of a task loss (typically the MSE) and of a weight-update compression (WUC) loss, for example as follows:

Loss=lamba1*task_loss+lambda2*WUC

Where lambda1 and lambda2 are predefined or automatically determined multipliers of the reconstruction loss and of the compression loss, respectively.

In one embodiment, the overfitting may be performed by initially using only the task loss for a number of iterations and then using a combination of a task loss and a weight-update compression loss.

The WUC loss can be defined as follows:

$$L_c(x) = \frac{|x|}{\|x\|} \quad \text{(Eq. 1)}$$

where $|x|$ and $\|x\|$ stands for the l1 and l2 norm of the vector x, respectively.

Here, the vector x is the weight-update vector, defined as follows: $x=w_{t-1}-w_0$ where t−1 indicates the previous overfitting iteration. Thus, $w_{t-1}$ is the weight vector obtained at the previous iteration and $w_0$ is the pretrained weight vector, e.g., the weight vector before starting the overfitting.

Without wishing to be bound by any theory, but simply in order to validate the compression aspect of the proposed loss, the following theorems are presented:

Theorem 1: Let x be any vector (e.g., the weight-update vector), then (i) critical points of the objective $$L_c(x) = \frac{|x|}{\|x\|}$$

are reached by the optimization process when the vector x is sparse, e.g., when several elements have values near zero. At critical points, lower values of the objective correspond to higher percentage of elements having value near zero.

(ii) absolute values of nonzero elements of x at the critical point are the same.

Theorem 1(i) covers the sparsity aspect of the loss. Theorem 1(ii) covers the compressibility aspect of the nonzero elements in vector x since it shows that the nonzero elements in the critical point are identical, thus making the nonzero part of the vector x binary-like with only two elements (c or −c). Both Theorem 1(i) and Theorem 1(ii) may be beneficial for entropy encoding the vector, as its entropy would be low.

The WUC loss can alternatively be defined using equation 2:

$$L_c(x) = \frac{|x|}{\|x\|} + \gamma \frac{\|x\|^2}{|x|} \quad \text{(Eq. 2)}$$

where the vector x is the weight-update vector, defined as follows: $x=w_{t-1}-w_0$ where t−1 indicates the previous overfitting iteration, $w_{t-1}$ is the weight vector obtained at the previous iteration, and $w_0$ is the pretrained weight vector, e.g., the weight vector before starting the overfitting.

Alternatively or additionally, other theorems can be used to understand and model the weight-update vectors for compression during encoding/decoding.

Theorem 2: Let x be any vector (e.g., the weight-update vector), then (iii) critical points of the objective $$L_c(x) = \frac{|x|}{\|x\|} + \gamma \frac{\|x\|^2}{|x|}$$

are reached by the optimization process when the vector x is sparse, e.g., when several elements have a value near zero. At critical points, lower values of the objective may correspond to a higher percentage of elements having a value near zero.

(iv) absolute values of nonzero elements of x at the critical point are the same. The absolute values of nonzero elements tend to decrease at lower values of the objective.

The desired properties of the compression loss (i) and (ii) can be generalized as follows:

a. The compression loss function at saddle points corresponds to a vector where several elements (e.g., weight-update values) have a value near zero, therefore the vector is said to be sparse.

b. Saddle points of the compression loss function with a low value correspond to a vector where a high number of elements have a value near zero. Saddle points of the compression loss function with a high value correspond to a vector where a low number of elements have a value near zero.

c. absolute values of non-zero elements of the vector on which the loss function is computed are substantially equal to each other at the plurality of saddle points In order to make the most out of the compression that is to be performed after the training, it is beneficial to also quantize the weight-updates of the neural network layers. This is beneficial because for example compressing the vector [0.001 0.002 0.003 12.001 12.002] is more difficult than compressing [0 0 0 12 12] although both vectors are extremely similar. Moreover, the amount of actual sparsity is higher in the latter vector, since in the former vector the values in corresponding indices are still larger than zero (although very small). Thus, quantization of weight updates is an important aspect to be considered for compression. One option may be to directly quantize the weight-updates based on either a uniform or non-uniform quantization after the training. But the network may not be robust to this quantization and such quantization after training may significantly degrade performance. Instead one may approximate the quantization during training such that the network would learn to be robust to quantization after training.

A way to approximate quantization is by additive noise. In an instance in which the weight-update is in the interval [a,b] where a and b may be predefined, a uniform quantization would be applied such that this interval is divided into equal length intervals where each end of the sub-interval defines the quantized value, e.g., [a,a+µ, a+2µ, . . . , b−2µ,b−µ,b]. Then, the quantization can be approximated by additive random noise. For example, if a number a+0.6µ, is to be quantized (to a+µ, the additive "noise" is 0.4µ. Theoretically, this noise changes in the interval [−0.5µ, 0.5µ]. Therefore, one way to make the network robust to quantization is to randomly add noise in interval [−0.5µ, 0.5µ] to the weight-updates of neural network layers to be quantized. µ is considered to be a hyper-parameter here, defining the level of the quantization.

As discussed for the pre-training, it may similarly be beneficial in the case of overfitting to re-generate the training data every few iterations or epochs, for the case of in-loop neural network.

Initially, the input data would be produced by running the encoder and by using the pretrained neural network for prediction. Then, the reconstructed data is obtained by adding the corresponding quantized residual to the prediction.

Every few iterations or epochs, the data would be re-generated by re-running the encoder and by using the latest overfitted neural network for prediction.

In any case (even if the data is not re-generated every few iterations/epochs), once the neural network has been overfitted, the encoder needs to be run with the final version of the overfitted neural network in order to have the final encoded image bitstream.

In addition to the encoded image bitstream, the approach can include encoding the weight-update obtained from the overfitting process. This weight update can be represented by u=w_T-w_0, where w_T is the weight vector at the end of the overfitting. This weight update can be assumed to have many values close to zero and the other values to be close to quantized values, due to the effect of the compression loss. Thus, in some embodiments it is possible to apply a predefined pruning threshold which sets the values which are near-zero (in absolute value) to zero. In other words, all weight-update elements whose absolute values are less than the predefined threshold, are set to zero. Then, in some embodiments it is possible to apply a clustering method such as k-means clustering with preferably a predefined number of clusters, in order to perform quantization. This way, only the quantized non-zero values need to be sent, together with indications of where the zero values occur (for example by using a binary indicator vector). The quantized non-zero values may be represented by the cluster labels and by the list of cluster centroids values.

In some cases, the selected w_T may not be the weight vector obtained at the last iteration of overfitting, but it may have been produced at a previous iteration. This may happen for example if the weight-update at the end of the overfitting does not allow for sufficient quality improvement, for example because it has been compressed too much. Or, it may happen that a certain combination of a pruning threshold and a number of quantization clusters applied on a previous weight-update has resulted in a better rate/distortion ratio than when using the latest weight update.

The weight-update which has been pruned and quantized may then be encoded by an entropy-encoder, such as an arithmetic encoder.

It may happen that the improvement of the overfitted network with respect to the pretrained network, when measured on the image to be encoded, for example based on Peak-Signal-to-Noise-Ratio (PSNR) or MSE, is not sufficiently high (for example based on a predefined threshold), and the encoder system may decide not to encode any weight-update, and it may optionally signal to the decoder that no weight-update needs to be applied to the pretrained network.

In some embodiments, the encoder system may skip the overfitting process if the quality (for example as measured by PSNR or MSE) achieved by the pretrained network is sufficiently high (for example with respect to a predefined threshold). Then, the encoder may not include any weight update into the encoded bitstream, and it may optionally signal to the decoder that there is no need to update the pretrained neural network, for example by including a flag into the bitstream.

At the decoder-side, the weight-update may be decoded (e.g., entropy-decoded if it was entropy-encoded at encoder side). Other reconstruction steps may be needed, for example if the zeros were omitted and some signaling has been used for indicating where the zeros should be re-inserted into the reconstructed weight-update. Also, cluster labels may be assigned the corresponding centroid values in order to reconstruct the quantized non-zero values.

Once the weight-update has been decoded and reconstructed, it is then applied to the corresponding pretrained network. The application may comprise adding the weight-update vector to the weight vector of the pretrained network.

When a new weight-update is sent to the decoder (with the corresponding encoded image), the decoder may need to reset the previously-updated network to its original state, e.g., to the state of the pretrained network.

In some embodiments, the encoder-side may indicate (e.g., with a flag) whether the decoder may skip the reset and instead apply the new weight-update to the latest version of its neural network (e.g., to the previously overfitted neural network). In yet another alternative embodiment, the encoder-side may indicate that there is no need to update the network at all, or that the update to be performed is only to reset the network to its original state, e.g., to the state of the pretrained network.

Referring now to FIG. 4, a method 10 is described for training and using a neural network for encoding/decoding media data. In some embodiments, the method 10 can include training the neural network on a training dataset, wherein the training comprises applying a task loss function and a weight-update compression loss function, the weight-update compression loss function comprising a weight-update vector defined as a latest weight vector minus an initial weight vector before training, at 11. In some embodiments, the weight-update compression loss function comprises a ratio of an L1-norm of the weight-update vector to an L2-norm of the weight-update vector. In some embodiments, the method 10 can further include pruning weight-update values which are within a predetermined range from zero, and quantizing the weight-update values and the pruned weight-update values, at 12. In some embodiments, the method 10 can further include entropy encoding the resulting weight-update vector to obtain a compressed weight-update vector, at 13. In some embodiments, the method 10 can further, optionally, be configured such that the weight-update compression loss function is reduced, such as minimized, to increase a sparsity and a quantizability of non-zero weight-update values, at 14. In some embodiments, the method 10 can further, optionally, be configured such that reducing, e.g., minimizing, the weight-update compression loss function lowers an entropy of the weight-update vector of the trained neural network, at 15.

Referring now to FIG. 5, a method 20 is described for compressing weight-updates for a neural network for encoding/decoding media data. In some embodiments, the method 20 can include providing a pre-trained neural network, the pre-trained neural network having been previously trained, using a training dataset, by applying a task loss function and a weight-update compression loss function, the weight-update compression loss function comprising a weight-update vector defined as a latest weight vector minus an initial weight vector before training, at 21. In some embodiments, the weight-update compression loss function comprises a ratio of an L1-norm of the weight-update vector to an L2-norm of the weight-update vector. In some embodiments, the method 20 can further include, in an instance in which a weight-update compression loss function was used in pretraining, compressing the pre-trained neural network by pruning one or more small-valued weights and quantizing the non-pruned weighs, at 22. In some embodiments, the method 20 can further, optionally, be configured such that the weight-update compression loss function is reduced, e.g., minimized, to increase a sparsity and a quantizability of non-zero weight-update values, at 23. In some embodiments, the method 20 can further, optionally, be configured such that reducing, such as minimizing, the weight-update compression loss function lowers an entropy of the weight-update vector of the trained neural network, at 24.

Referring now to FIG. 6, a method 30 is described for training and using a neural network. The method 30 includes temporarily overfitting a neural network on a first image of a plurality of images for a first predetermined number of times to generate a first temporarily overfitted neural network, at 31. The method 30 can further include, after iteratively temporarily-overfitting the neural network on the first image of the plurality of images, resetting one or more weights to an initial weight value, at 32. The method 30 can further include, iteratively, temporarily-overfitting the first temporarily overfitted and reset neural network to a second image of the plurality of images for a second predetermined number of times to generate a second temporarily overfitted neural network, at 33. The method 30 can further include computing an average loss over all the temporarily overfitted neural networks, based on the performance of the first temporarily overfitted neural network relative to the first image and the performance of the second temporarily overfitted neural network relative to the second image, at 34. The method 30 can further include computing one or more gradient values based on the average loss value and one or more neural network weights, at 35. The method 30 can further include updating the neural network using the gradient values, at 36. The method 30 can further include determining whether the neural network has been iteratively temporarily-overfitted to a predetermined number of images of the plurality of images such that the neural network is sufficiently pretrained, at 37. If it is determined that the overfitting and resetting steps have not been iterated a sufficient number of times, the method 30 can include repeating steps 31-36 one or more additional times. In an instance in which it is determined that the overfitting and resetting steps have been iterated the sufficient number of times, the iteration of steps 31-36 can be discontinued. The method 30 can further include using a final updated neural network as a pretrained neural network, the pretrained neural network usable as a starting point when overfitting the neural network to a small set of data to be encoded, at 38.

Described herein are a method, apparatus and computer program product are provided in accordance with an example embodiment for compressing weights for decoder-side neural networks. As a result of the compression, neural networks may be efficiently represented such that the requirements for memory and the computational complexity are reduced, thereby enabling efficient transmission of neural networks among devices.

In one example embodiment, a method is provided that includes training a neural network on a training dataset. In some embodiments, the training can comprise applying a task loss function and a weight-update compression loss function to the neural network during training. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the weight-update compression loss can be derived from the weight update. In some embodiments, the weight-update compression loss can be reduced, such as minimized, so the weight-updates are sparser (with many values close to zero) and the non-zero values can be closer to quantized values. In some embodiments, the weight-updates are sparsified by setting small weight-update values to zero based on a predetermined threshold. In some embodiments, the weight-update values may be quantized for example using a clustering algorithm. In some embodiments, reducing the weight-update compression loss may lower an entropy of a weight-update vector of the trained neural network. In some embodiments, the method can further include entropy encoding the weight-update to obtain a compressed weight-update.

In another example embodiment, a method is provided that includes providing a pre-trained neural network. In some embodiments, the neural network may be pretrained by maximizing generalization on a held-out validation dataset, by using at least a task loss function. In some other embodiments, the neural network may be pretrained by maximizing generalization on a held-out validation dataset, by using at least a task loss function and a weight compression loss. In some other embodiments, the neural network can be pretrained by using as a loss the average task loss of a set of temporarily overfitted models. In some embodiments, the temporarily overfitted models have each been overfitted to a small portion of data (such as a single image). In some embodiments, the neural network can be pretrained by applying a task loss function in the temporary overfitting stage. In some other embodiments, the neural network can be pretrained by applying a task loss function and a weight-update compression loss function in the temporary overfitting stage. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the method can further include compressing the weight-updates by pruning small-valued weight-updates. In some embodiments, weight-update compression loss can be reduced, such as minimized, so the weight-updates are more quantizable. In some embodiments, the weight-updates can be made sparser (with more values close to zero) and the non-zero values can be closer to quantized values. In some embodiments, reducing the weight-update compression loss may lower an entropy of a weight-update vector of the trained neural network.

In another example embodiment, an apparatus is provided that includes at least one processor and at least one memory that includes computer program code with the at least one memory and the computer program code configured to, with the at least one processor, cause the apparatus to at least train a neural network on a training dataset, wherein the training comprises applying a task loss function and a weight-update compression loss function. The weight-update compression loss function can comprise a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the at least one memory and the computer program code can be configured to, with the at least one processor, cause the apparatus to at least entropy encode the neural network to obtain a compressed neural network. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes at least one processor and at least one memory that includes computer program code with the at least one memory and the computer program code configured to, with the at least one processor, cause the apparatus to at least provide a pre-trained neural network. The pre-trained neural network has been previously trained, using a training dataset, by applying a task loss function and a weight-update compression loss function. The weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the at least one memory and the computer program code can be configured to, with the at least one processor, cause the apparatus to at least compress the pre-trained neural network by pruning small-valued weights. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes means for training a neural network on a training dataset. In some embodiments, the apparatus can include means for training the neural network by, at least, applying a task loss function and a weight-update compression loss function to the neural network. In some embodiments, the weight-update compression loss function comprises a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the apparatus can further include means for entropy encoding the neural network to obtain a compressed neural network. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In another example embodiment, an apparatus is provided that includes means for providing a pre-trained neural network. In some embodiments, the pre-trained neural network can be previously trained, using a training dataset, by applying a task loss function and a weight-update compression loss function. In some embodiments, the weight-update compression loss function can comprise a weight-update vector. In some embodiments, the weight-update vector can be defined as a latest weight vector minus an initial weight vector before training. In some embodiments, the weight-update compression loss function comprises a ratio of an L1-norm of the weight-update vector to an L2-norm of the weight-update vector. In some embodiments, the apparatus can further include means for compressing the pre-trained neural network by pruning small-valued weights. In some embodiments, the weight-update compression loss can be reduced, such as minimized, so as weight-updates are sparser (with many values close to zero) and the non-zero values can be closer to quantized values. In some embodiments, reducing the weight-update compression loss may lower an entropy of a weight-update vector of the trained neural network.

In a further example embodiment, a computer program product is provided that includes at least one non-transitory computer-readable storage medium having computer-executable program code instructions stored therein with the computer-executable program code instructions including program code instructions configured to at least cause one or more processors to train a neural network on a training dataset. The training comprises applying a task loss function and a weight-update compression loss function. The weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to at least cause the one or more processors to entropy encode the neural network to obtain a compressed neural network. In some embodiments, the weight-update compression loss can be reduced, such as minimized, so as weight-updates to be sparser (with many values close to zero) and the non-zero values can be closer to quantized values. In some embodiments, reducing the weight-update compression loss may lower an entropy of a weight-update vector of the trained neural network.

In a further example embodiment, a computer program product is provided that includes at least one non-transitory computer-readable storage medium having computer-executable program code instructions stored therein with the computer-executable program code instructions including program code instructions configured to at least cause one or more processors to provide a pre-trained neural network, the pre-trained neural network having been previously trained, using a training dataset, by applying a task loss function and a weight-update compression loss function, the weight-update compression loss function comprising a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to at least cause the one or more processors to compress the pre-trained neural network by pruning small-valued weights. In some embodiments, the weight-update compression loss can be reduced, such as minimized, so as to be sparser (with many values close to zero) and the non-zero values can be closer to quantized values. In some embodiments, reducing the weight-update compression loss may lower an entropy of a weight-update vector of the trained neural network.

In another embodiment, a method is provided that includes temporarily overfitting a neural network on a first image of a plurality of images for a first predetermined number of times to generate a first temporarily overfitted neural network. In some embodiments, the method can further include, after iteratively temporarily overfitting the neural network on the first image of the plurality of images, resetting one or more weights to an initial weight value. In some embodiments, the method can further include iteratively temporarily overfitting the first temporarily overfitted and reset neural network to a second image of the plurality of images for a second predetermined number of times to generate a second temporarily overfitted neural network. In some embodiments, the method can further include, after iteratively temporarily overfitting the neural network on the second image of the plurality of images, resetting one or more weights to an initial weight value. In some embodiments, the method can further include iteratively temporarily overfitting the neural network on any number of additional images of the plurality of images, resetting the neural network after some or all of the temporary overfitting steps. In some embodiments, the method can include temporarily overfitting the neural network on each of the plurality of images and resetting after each iterative temporary overfitting step. In some embodiments, iteratively temporarily overfitting the neural network comprises applying at least a task loss function and a weight-update compression loss function. In some embodiments, the method can further include computing an average loss over the overfitted neural networks, based on the performance of the first overfitted neural network relative to the first image and the performance of the second overfitted neural network relative to the second image. In some embodiments, the method can further include computing one or more gradient values based on the average loss value and one or more neural network weights. In some embodiments, the method can further include updating the neural network using the gradient values. In some embodiments, the method can further include repeating the above updating for a number of iterations. In some embodiments, the method can further include using a final updated neural network as a pretrained neural network. The pretrained neural network is usable as a starting point when overfitting the neural network to a small set of data to be encoded.

In another example embodiment, an apparatus is provided that includes at least one processor and at least one memory that includes computer program code with the at least one memory and the computer program code configured to, with the at least one processor, cause the apparatus to at least temporarily overfit a neural network on a first image of a plurality of images a first predetermined number of times to generate a first temporarily overfitted neural network. In some embodiments, overfitting can be carried out using a task loss function and/or a weight-update compression loss function. In some embodiments, the weight-update compression loss function can comprise a ratio of an L1-norm of a weight-update vector to an L2-norm of the weight-update vector. In some embodiments, the at least one memory and the computer program code can be configured to, with the at least one processor, cause the apparatus to at least, after the neural network is iteratively temporarily overfit on the first image of the plurality of images, reset one or more weights to an initial weight value. In some embodiments, the at least one memory and the computer program code can be configured to, with the at least one processor, cause the apparatus to at least iteratively temporarily overfit the first temporarily overfitted and reset neural network to a second image of the plurality of images a second predetermined number of times to generate a second temporarily overfitted neural network. In some embodiments, the at least one memory and the computer program code can be configured to, with the at least one processor, cause the apparatus to at least iteratively overfit the neural network on any number of additional images of the plurality of images and reset the neural network after overfitting the neural network on some or all of the respective images. In some embodiments, the at least one memory and the computer program code can be configured to, with the at least one processor, cause the apparatus to at least overfit the neural network on each of the plurality of images and resetting after each iterative overfitting step. In some embodiments, the at least one memory and the computer program code can be configured to, with the at least one processor, cause the apparatus to at least computing an average loss over the overfitted neural networks, based on the performance of the first temporarily overfitted neural network relative to the first image and the performance of the second temporarily overfitted neural network relative to the second image. In some embodiments, the at least one memory and the computer program code can be configured to, with the at least one processor, cause the apparatus to at least compute one or more gradient values based on the average loss value and one or more neural network weights. In some embodiments, the at least one memory and the computer program code can be configured to, with the at least one processor, cause the apparatus to at least update the neural network using the gradient values. In some embodiments, the at least one memory and the computer program code can be configured to, with the at least one processor, cause the apparatus to at least repeat the above updating for a number of iterations. In some embodiments, the apparatus can be configured to determine when the neural network has been temporarily prefitted on a predetermined number of images and to discontinue the above described steps thereafter. In some embodiments, after discontinuing the iterative temporary overfitting of the neural network on individual images or other data from the training database, a final updated neural network is formed.

In some embodiments, the at least one memory and the computer program code can be configured to, with the at least one processor, cause the apparatus to at least use the final updated neural network as a pretrained neural network. The pretrained neural network is usable as a starting point when overfitting the neural network to a small set of data to be encoded. In some embodiments, iteratively overfitting the neural network comprises applying at least a task loss function and/or a weight-update compression loss function.

In another example embodiment, an apparatus is provided that includes means, such as the processor, for training a neural network on a training dataset. In some embodiments, the apparatus can include means, such as the processor, for temporarily overfitting a neural network on a first image of a plurality of images for a first predetermined number of times to generate a first temporarily overfitted neural network. In some embodiments, the apparatus can include means, such as the processor, such that, after iteratively, temporarily overfitting the neural network on the first image of the plurality of images, resetting one or more weights to an initial weight value. In some embodiments, the apparatus can include means, such as the processor, for iteratively temporarily-overfitting the first temporarily overfitted and resetting the neural network to a second image of the plurality of images for a second predetermined number of times to generate a second temporarily overfitted neural network. In some embodiments, the apparatus can include means, such as the processor, for computing an average loss over all the temporarily overfitted neural networks, based on the performance of the first temporarily overfitted neural network relative to the first image and the performance of the second temporarily overfitted neural network relative to the second image. In some embodiments, the apparatus can include means, such as the processor, for computing one or more gradient values based on the average loss value and one or more neural network weights. In some embodiments, the apparatus can include means, such as the processor, for updating the neural network using the gradient values. In some embodiments, apparatus can include means, such as the processor, for causing the apparatus to at least repeat each of the above steps in the proper order for a predetermined number of iterations. In some embodiments, the apparatus can include means, such as the processor, for determining when the neural network has been temporarily prefitted on the predetermined number of images and to discontinue the above described steps thereafter. In some embodiments, after discontinuing the iterative temporary overfitting of the neural network on individual images or other data from the training database, a final updated neural network is formed. In some embodiments, the apparatus can include means, such as the processor, for using the final updated neural network as a pretrained neural network. In some embodiments, the pretrained neural network is usable as a starting point when overfitting the neural network to a small set of data to be encoded. In some embodiments, iteratively overfitting the neural network comprises applying at least a task loss function and/or a weight-update compression loss function.

In a further example embodiment, a computer program product is provided that includes at least one non-transitory computer-readable storage medium having computer-executable program code instructions stored therein with the computer-executable program code instructions including program code instructions configured to at least temporarily overfit a neural network on a first image of a plurality of images for a first predetermined number of times to generate a first temporarily overfitted neural network. In some embodiments, overfitting can be carried out by applying a task loss function and/or a weight-update compression loss function. In some embodiments, the weight-update compression loss function comprises a weight-update vector defined as a latest weight vector minus an initial weight vector before training. In some embodiments, the weight-update compression loss function comprises a ratio of an L1-norm of the weight-update vector to an L2-norm of the weight-update vector. In some embodiments, the computer-executable program code instructions stored on the non-transitory computer-readable storage medium can be configured to, after iteratively temporarily-overfitting the neural network on the first image of the plurality of images, at least reset one or more weights to an initial weight value. In some embodiments, the computer-executable program code instructions stored on the non-transitory computer-readable storage medium can be configured to at least iteratively temporarily-overfit the first temporarily overfitted and reset neural network to a second image of the plurality of images for a second predetermined number of times to generate a second temporarily overfitted neural network. In some embodiments, the computer-executable program code instructions stored on the non-transitory computer-readable storage medium can be configured to at least compute an average loss over all the temporarily overfitted neural networks, based on the performance of the first temporarily overfitted neural network relative to the first image and the performance of the second temporarily overfitted neural network relative to the second image. In some embodiments, the computer-executable program code instructions stored on the non-transitory computer-readable storage medium can be configured to at least compute one or more gradient values based on the average loss value and one or more neural network weights. In some embodiments, the computer-executable program code instructions stored on the non-transitory computer-readable storage medium can be configured to at least update the neural network using the gradient values. In some embodiments, the computer-executable program code instructions stored on the non-transitory computer-readable storage medium can be configured to at least repeat each of the above steps in the proper order for a predetermined number of iterations. In some embodiments, the computer-executable program code instructions stored on the non-transitory computer-readable storage medium can be configured to at least determine when the neural network has been temporarily prefitted on the predetermined number of images and to discontinue the above described steps thereafter. In some embodiments, after discontinuing the iterative temporary overfitting of the neural network on individual images or other data from the training database, a final updated neural network is formed. In some embodiments, the computer-executable program code instructions stored on the non-transitory computer-readable storage medium can be configured to at least use the final updated neural network as a pretrained neural network. In some embodiments, the pretrained neural network is usable as a starting point when overfitting the neural network to a small set of data to be encoded. In some embodiments, the iteratively temporarily-overfit neural network can be overfit by applying at least a task loss function and/or a weight-update compression loss function.

In some embodiments, a method for pretraining a neural network can include maximizing generalization performance, such as by reducing, such as minimizing, at least a task loss on a held-out validation dataset. In some embodiments, a method for pretraining a neural network can include maximizing generalization performance and compression of weights, such as by reducing at least a task loss and a weights compression loss on a held-out validation dataset. In some embodiments, the method for pretraining a neural network can include maximizing the overfitting performance, such as by reducing, such as minimizing, the average task loss, averaged over a set of temporarily overfitted models. In some embodiments, each temporarily overfitted model is a model temporarily overfitted on a relatively small (e.g., one) set of data (e.g., images). In some embodiments, the iterative temporary overfitting can start from an initial version of the pretrained model or a partially trained model or an untrained model. After each temporary overfitting step, the model can be reset to the state before the latest temporary overfitting step. In other words, the model can be reset to the pretrained version of the model. In some embodiments, temporary overfitting can be carried out using at least the task loss. In some embodiments, the temporary overfitting can be carried out using at least the task loss and the weight-update compression loss. In some embodiments, once the neural network is pretrained, the pretrained neural network can be overfitted on a small set of data (e.g., one image) that is to be compressed or encoded. In some embodiments, the overfitting can be carried out using at least the task loss (task loss function). In some embodiments, the overfitting can be carried out using at least the task loss (task loss function) and the weight-update compression loss (weight-update compression loss function).

In some embodiments, an apparatus can be provided that comprises: means for training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; and means for pruning weight-update values which are within a predetermined range from zero, and quantizing the weight-update values and the pruned weight-update values. In some embodiments, the apparatus can further comprise: means for entropy encoding the resulting weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, an apparatus can be provided that comprises: means for pretraining a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values, the apparatus further comprising: means for repeating the updating for a number of iterations. In some embodiments, the apparatus can further comprise: means for using a final updated neural network as a starting point when overfitting the neural network to a set of data to be encoded. In some embodiments, the apparatus can further comprise: means for entropy encoding the resulting weight-update vector to obtain a compressed weight-update vector.

In some embodiments, a method may be provided that comprises: training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; and pruning weight-update values which are within a predetermined range of zero, and quantizing the weight-update values and the pruned weight-update values. In some embodiments, the method can further comprise: entropy encoding the weight-update vector to obtain a compressed weight-update vector. In some embodiments, the weight-update compression loss function is minimized to increase a sparsity and a quantizability of non-zero weight-update values. In some embodiments, minimizing the weight-update values lowers an entropy of a weight-update vector of the trained neural network.

In some embodiments, a method can be provided that comprises: pretraining a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values; the method further comprising: repeating the updating for a number of iterations. In some embodiments, the method can further comprise using a final updated neural network as a starting point when overfitting the neural network to a set of data to be encoded. In some embodiments, the method can further comprise: entropy encoding the resulting weight-update vector to obtain a compressed weight-update vector.

In some embodiments, a computer-readable storage medium can be provided that has program code instructions stored therein that are configured, upon execution, to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;

prune weight-update values which are within a predetermined range of zero; and quantize the weight-update values and the pruned weight-update values. In some embodiments, the program code instructions can be further configured, upon execution, to: entropy encode the weight-update vector to obtain a compressed weight-update vector.

In some embodiments, a computer-readable storage medium can be provided that has program code instructions stored therein that are configured, upon execution, to: pretrain a neural network by: temporarily overfitting the neural network on a first image of a plurality of images for a first predetermined number of times to generate a first temporarily overfitted neural network; after iteratively temporarily-overfitting the neural network on the first image of the plurality of images, resetting one or more weights to an initial weight value; iteratively temporarily-overfitting the first temporarily overfitted and reset neural network to a second image of the plurality of images for a second predetermined number of times to generate a second temporarily overfitted neural network; computing an average loss over all the temporarily overfitted neural networks, based on the performance of the first temporarily overfitted neural network relative to the first image and the performance of the second temporarily overfitted neural network relative to the second image; computing one or more gradient values based on the average loss value and one or more neural network weights; and updating the neural network using the gradient values. In some embodiments, the program code instructions are further configured, upon execution, to: repeat the updating for a number of iterations. In some embodiments, the program code instructions are further configured, upon execution, to: use a final updated neural network as a pretrained neural network, the pretrained neural network usable as a starting point when overfitting the neural network to a small set of data to be encoded.

In some embodiments, a method is provided that comprises: training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; pruning weight-update values which are between zero and a predetermined threshold value; and quantizing the weight-update values and the pruned weight-update values. In some embodiments, the method can further comprise: entropy encoding the resulting weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, a method is provided, that comprises: a) temporarily overfitting a neural network on a first image of a plurality of images for a first predetermined number of times to generate a first temporarily overfitted neural network; b) after temporarily-overfitting the neural network on the first image of the plurality of images for the first predetermined number of times, resetting one or more weights to an initial weight value to generate a first temporarily overfitted and reset neural network; c) temporarily overfitting the first temporarily overfitted and reset neural network to a second image of the plurality of images for a second predetermined number of times to generate a second temporarily overfitted neural network; d) computing an average loss over all the temporarily overfitted neural networks, based on a performance of the first temporarily overfitted neural network relative to the first image and the performance of the second temporarily overfitted neural network relative to the second image; e) computing one or more gradient values based on the average loss value and one or more neural network weights; and f) updating the neural network using the gradient values. In some embodiments, the method further comprises: repeating each of a-e a number of times to generate a pretrained neural network. In some embodiments, the method further comprises: overfitting the pretrained neural network to a small set of data to be encoded.

In some embodiments, an apparatus is provided that comprises at least one processor and at least one memory storing computer program code, the at least one memory and the computer program code configured to, with the processor, cause the apparatus to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; prune weight-update values which are between zero and a predetermined threshold value; and quantize the weight-update values and the pruned weight-update values. In some embodiments, the at least one memory and the computer program code are further configured to, with the processor, to cause the apparatus to: entropy encode the weight-update vector to obtain a compressed weight-update vector. In some embodiments, the weight-update compression loss function is minimized to increase a sparsity and a quantizability of non-zero weight-update values. In some embodiments, minimizing the weight-update values lowers an entropy of a weight-update vector of the trained neural network.

In some embodiments, an apparatus is provided that configures to pretrain and use a neural network, the apparatus comprising at least one processor and at least one memory storing computer program code, the at least one memory and the computer program code configured to, with the processor, cause the apparatus to: a) temporarily overfit the neural network on a first image of a plurality of images for a first predetermined number of times to generate a first temporarily overfitted neural network; b) after temporarily-overfitting the neural network on the first image of the plurality of images for the first predetermined number of times, reset one or more weights to an initial weight value to generate a first temporarily overfitted and reset neural network; c) temporarily overfit the first temporarily overfitted and reset neural network to a second image of the plurality of images for a second predetermined number of times to generate a second temporarily overfitted neural network; d) compute an average loss over all the temporarily overfitted neural networks, based on a performance of the first temporarily overfitted neural network relative to the first image and the performance of the second temporarily overfitted neural network relative to the second image; e) compute one or more gradient values based on the average loss value and one or more neural network weights; and f) update the neural network using the gradient values. In some embodiments, the at least one memory and the computer program code are further configured to, with the processor, cause the apparatus to: repeat each of a-e a number of times to generate a pretrained neural network. In some embodiments, the at least one memory and the computer program code are further configured to, with the processor, cause the apparatus to: overfit the pretrained neural network to a small set of data to be encoded.

In some embodiments, a computer program product is provided that comprises a non-transitory computer-readable storage medium having stored thereon computer-readable code, which, when executed by at least one processor, causes the at least one processor to: train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector; prune weight-update values which are between zero and a predetermined threshold value; and quantize the weight-update values and the pruned weight-update values. In some embodiments, the computer-readable code, when executed by the at least one processor, further causes the at least one processor to: entropy encode the weight-update vector to obtain a compressed weight-update vector. In some embodiments, the weight-update compression loss function is minimized to increase a sparsity and a quantizability of non-zero weight-update values. In some embodiments, minimizing the weight-update compression loss function lowers an entropy of the weight-update vector of the trained neural network.

In some embodiments, a computer program product is provided, the computer program product being operable for pretraining and using a neural network, the computer program product comprising a non-transitory computer-readable storage medium having stored thereon computer-readable code, which, when executed by at least one processor, causes the at least one processor to: a) temporarily overfit the neural network on a first image of a plurality of images for a first predetermined number of times to generate a first temporarily overfitted neural network; b) after temporarily-overfitting the neural network on the first image of the plurality of images for the first predetermined number of times, reset one or more weights to an initial weight value to generate a first temporarily overfitted and reset neural network; c) temporarily overfit the first temporarily overfitted and reset neural network to a second image of the plurality of images for a second predetermined number of times to generate a second temporarily overfitted neural network; d) compute an average loss over all the temporarily overfitted neural networks, based on a performance of the first temporarily overfitted neural network relative to the first image and the performance of the second temporarily overfitted neural network relative to the second image; e) compute one or more gradient values based on the average loss value and one or more neural network weights; and f) update the neural network using the gradient values. In some embodiments, the computer-readable code, when executed by the at least one processor, further causes the at least one processor to: repeat each of a-f a number of times to generate a pretrained neural network; and overfit the pretrained neural network to a small set of data to be encoded.

As described above, FIGS. 4-6 are flowcharts of an apparatus 100, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 106 of an apparatus employing an embodiment of the present invention and executed by processing circuitry 104 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 4-6. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions. Further, certain of the operations represented by the flowcharts may be optional, such as illustrated by the dashed outlines.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;
pruning weight-update values which are between zero and a predetermined threshold value, wherein pruning comprises setting the weight-update values to zero; and
quantizing the non-pruned weight-update values and/or the pruned weight-update values.

2. The method of claim 1, further comprising:
entropy encoding the resulting weight-update vector to obtain an entropy-encoded weight-update vector.

3. The method of claim 1, wherein the weight-update compression loss function is minimized to increase a sparsity and a quantizability of weight-update values.

4. The method of claim 1, wherein the weight-update compression loss function is minimized to lower an entropy of the weight-update values.

5. An apparatus comprising:
at least one processor; and
at least one memory storing computer program code, the at least one memory and the computer program code being configured to, with the processor, cause the apparatus to:
train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;
prune weight-update values which are between zero and a predetermined threshold value, wherein pruning comprises setting the weight-update values to zero; and
quantize the non-pruned weight-update values and/or the pruned weight-update values.

6. The apparatus of claim 5, wherein the at least one memory and the computer program code are further configured to, with the processor, to cause the apparatus to:
entropy encode the weight-update vector to obtain an entropy-encoded weight-update vector.

7. The apparatus of claim 5, wherein the weight-update compression loss function is minimized to increase a sparsity and a quantizability of weight-update values.

8. The apparatus of claim 5, wherein the weight-update compression loss function is minimized to lower an entropy of the weight-update values.

9. A computer program product comprising a non-transitory computer-readable storage medium having stored thereon computer-readable code, which, when executed by at least one processor, causes the at least one processor to:
train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;
prune weight-update values which are between zero and a predetermined threshold value, wherein pruning comprises setting the weight-update values to zero; and
quantize the non-pruned weight-update values and/or the pruned weight-update values.

10. The computer program product of claim 9, wherein the computer-readable code, when executed by the at least one processor, further causes the at least one processor to:
entropy encode the weight-update vector to obtain an entropy-encoded weight-update vector.

11. The computer program product of claim 9, wherein the weight-update compression loss function is minimized to increase a sparsity and a quantizability of weight-update values.

12. The computer program product of claim 9, wherein the weight-update compression loss function is minimized to lower an entropy of the weight-update values.

13. A method comprising:
training a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;
determining weight-update values which are between zero and a predetermined threshold value;
setting the weight-update values which are between zero and the predetermined threshold value to zero; and
quantizing at least one of the non-zero weight-update values or the zero weight-update values.

14. The method of claim 13, further comprising:
entropy encoding the resulting weight-update vector to obtain an entropy-encoded weight-update vector.

15. The method of claim 13, wherein the weight-update compression loss function is minimized to increase a sparsity and a quantizability of weight-update values.

16. The method of claim 13, wherein the weight-update compression loss function is minimized to lower-an entropy of the weight-update values.

17. An apparatus comprising:
at least one processor; and
at least one memory storing computer program code, the at least one memory and the computer program code being configured to, with the processor, cause the apparatus to:
train a neural network on a training dataset, wherein the training comprises applying at least a task loss function and a weight-update compression loss function, the weight-update compression loss function comprising a weight-update vector defined as a latest weight vector minus an initial weight vector before training, the weight-update compression loss function comprising a ratio of an L1-norm of the weight-update vector to an L2-norm of the weight-update vector;

determine weight-update values which are between zero and a predetermined threshold value;

set the weight-update values which are between zero and the predetermined threshold value to zero; and quantize at least one of the non-zero weight-update values or the zero weight-update values.

18. The apparatus of claim 17, wherein the at least one memory and the computer program code are further configured to, with the processor, to cause the apparatus to:

entropy encode the resulting weight-update vector to obtain an entropy-encoded-weight-update vector.

19. The apparatus of claim 17, wherein the weight-update compression loss function is minimized to increase a sparsity and a quantizability of the weight-update values.

20. The apparatus of claim 17, wherein the weight-update compression loss function is minimized to lower-an entropy of the weight-update values.

* * * * *